US011836386B2

(12) United States Patent
Tatsumi et al.

(10) Patent No.: US 11,836,386 B2
(45) Date of Patent: Dec. 5, 2023

(54) STORAGE SYSTEM AND METHOD OF CONTROLLING STORAGE SYSTEM THAT SET PORTS ASSOCIATED WITH A LOGICAL UNIT

(71) Applicant: Hitachi, Ltd., Tokyo (JP)

(72) Inventors: Ryosuke Tatsumi, Tokyo (JP); Akira Yamamoto, Tokyo (JP); Kazuki Matsugami, Tokyo (JP)

(73) Assignee: HITACHI, LTD., Tokyo (JP)

(*) Notice: Subject to any disclaimer, the term of this patent is extended or adjusted under 35 U.S.C. 154(b) by 0 days.

(21) Appl. No.: 17/881,945

(22) Filed: Aug. 5, 2022

(65) Prior Publication Data

US 2022/0374165 A1    Nov. 24, 2022

Related U.S. Application Data

(63) Continuation of application No. 17/198,665, filed on Mar. 11, 2021, now Pat. No. 11,429,316.

(30) Foreign Application Priority Data

Sep. 29, 2020    (JP) ................................ 2020-163134

(51) Int. Cl.
G06F 3/06    (2006.01)

(52) U.S. Cl.
CPC .......... G06F 3/0659 (2013.01); G06F 3/0607 (2013.01); G06F 3/067 (2013.01);
(Continued)

(58) Field of Classification Search
CPC ...... G06F 3/0659; G06F 3/0619; G06F 3/067; G06F 3/0607; G06F 3/0622; G06F 3/0658; G06F 3/0679
See application file for complete search history.

(56) References Cited

U.S. PATENT DOCUMENTS 6,625,691 B2    9/2003 Obara
7,409,508 B2    8/2008 Mizuno
(Continued)

FOREIGN PATENT DOCUMENTS

CN    111352574 A    6/2020
JP    2013-536478 A    9/2013
(Continued)

OTHER PUBLICATIONS

Japanese Office Action received in corresponding Japanese Application No. 2020-163134 dated Jul. 12, 2022.
(Continued)

*Primary Examiner* — Mark A Giardino, Jr.
(74) *Attorney, Agent, or Firm* — MATTINGLY & MALUR, PC

(57) ABSTRACT

In a multi controller storage system, hardware and software are updated without interruption. The storage system including a node has storage control units each including a processor, a memory, and a port; and a storage drive, and the storage control units each request data access and transmit and receive data with respect to a host computer via the ports. The processors process input and output data from the host computer, the memories store the control information in order to access the data stored in the storage drive, and the storage system transmits the control information stored in the memories to another node, stores the control information in the memories of the storage control units, and sets ports of the other node in consideration of a relationship between the storage control units and the ports of the nodes, if the other node can access data relating to the control information.

8 Claims, 23 Drawing Sheets

(52) U.S. Cl.
CPC .......... *G06F 3/0619* (2013.01); *G06F 3/0622* (2013.01); *G06F 3/0658* (2013.01); *G06F 3/0679* (2013.01)

(56) References Cited

U.S. PATENT DOCUMENTS

| | | |
|---|---|---|
| 8,977,781 B1 | 3/2015 | Yokoi et al. |
| 9,098,211 B1 | 8/2015 | Madnani et al. |
| 9,959,043 B2 | 5/2018 | Cao et al. |
| 2011/0191547 A1 | 8/2011 | Yoshii et al. |
| 2012/0166748 A1 | 6/2012 | Satoyama et al. |
| 2017/0139598 A1 | 5/2017 | Matsuda |
| 2017/0242771 A1 | 8/2017 | Khemani |
| 2017/0277914 A1 | 9/2017 | Araki et al. |
| 2019/0132752 A1* | 5/2019 | Qiao .................... H04W 24/02 |
| 2020/0210086 A1 | 7/2020 | Sonokawa et al. |

FOREIGN PATENT DOCUMENTS

| | | |
|---|---|---|
| JP | 2017-91355 A | 5/2017 |
| JP | 2020-106999 A | 7/2020 |
| WO | 2015/068239 A1 | 5/2015 |
| WO | 2016/075765 A1 | 5/2016 |

OTHER PUBLICATIONS

Chinese Office Action received in corresponding Chinese Application No. 202110188674.9 dated May 4, 2023.

\* cited by examiner

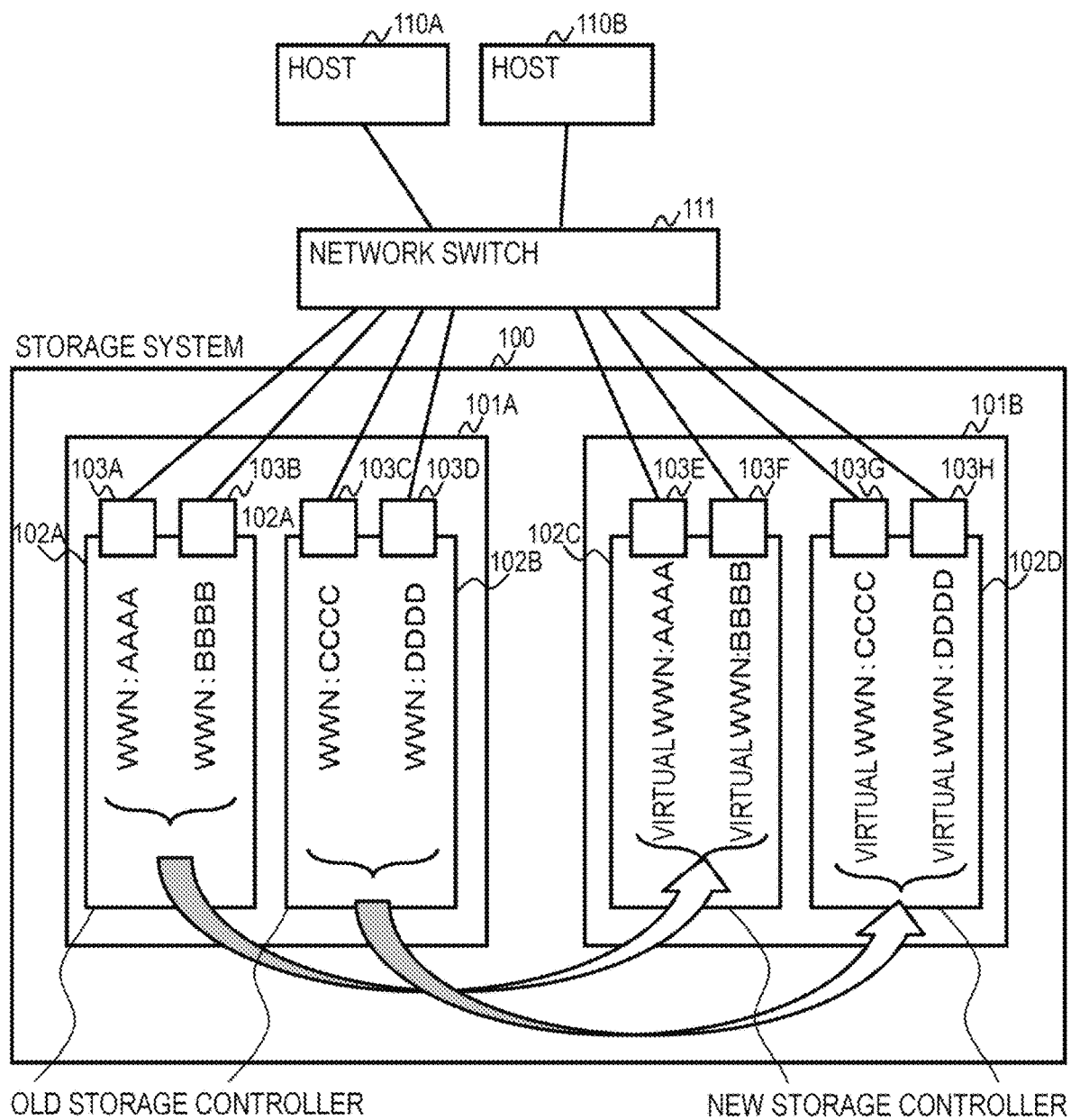

CONTROL INFORMATION CONFIGURATION INFORMATION

MOUNTING CONTROLLER MANAGEMENT INFORMATION

CONTROL INFORMATION FORMAT CONVERSION

CONTROL RIGHT MOVEMENT

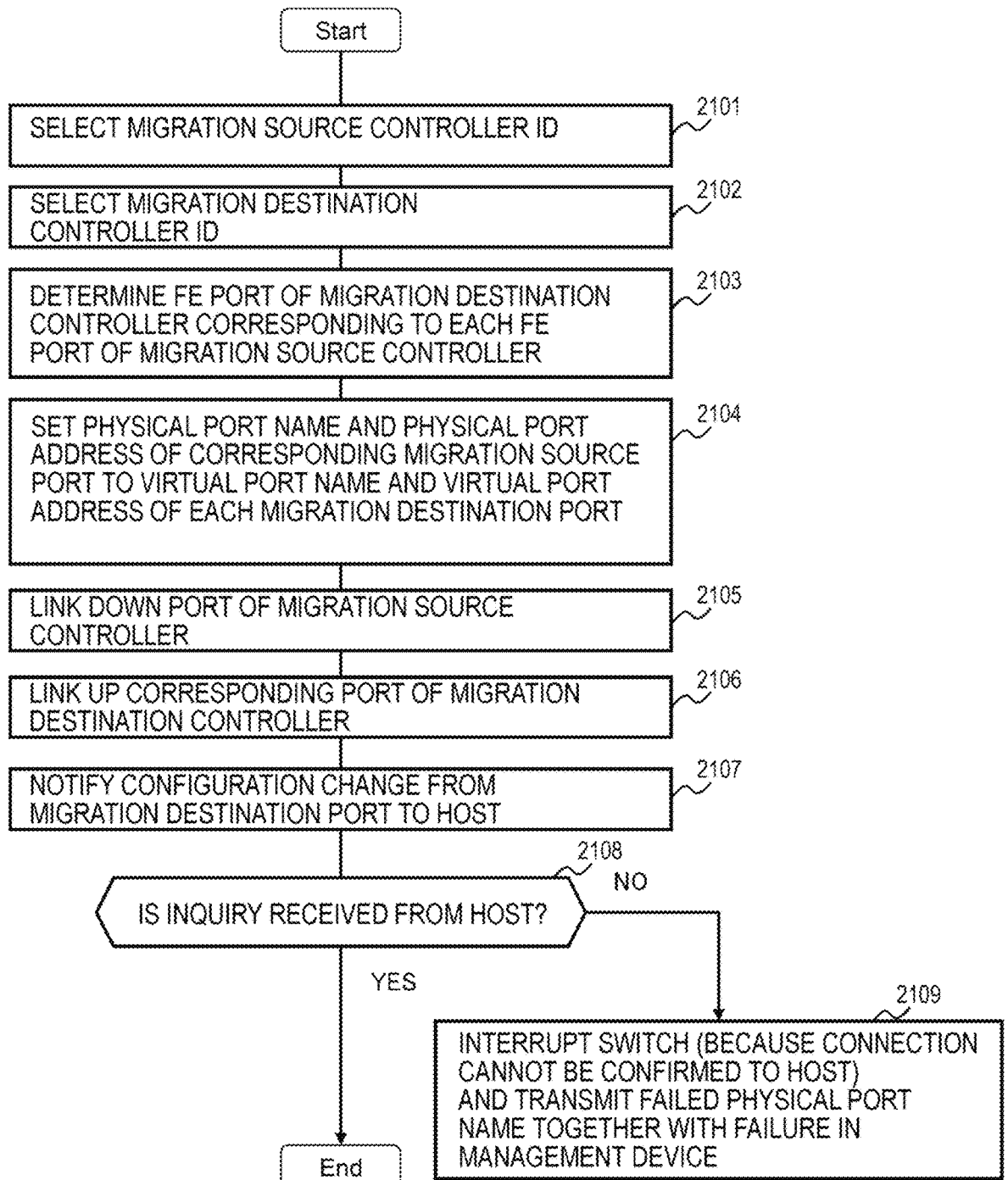

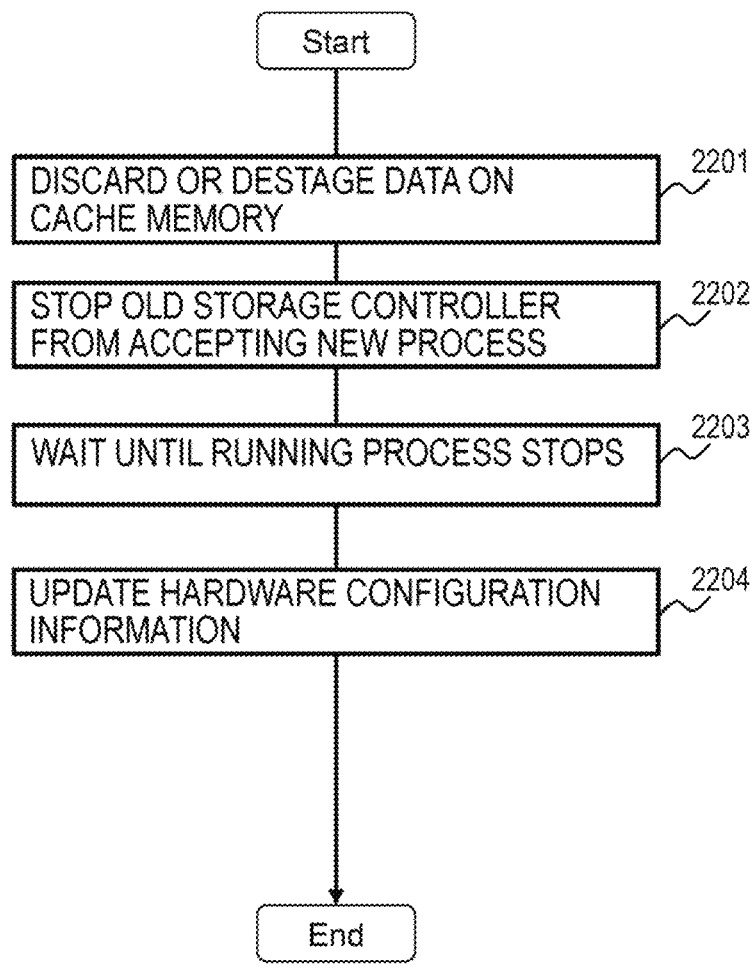

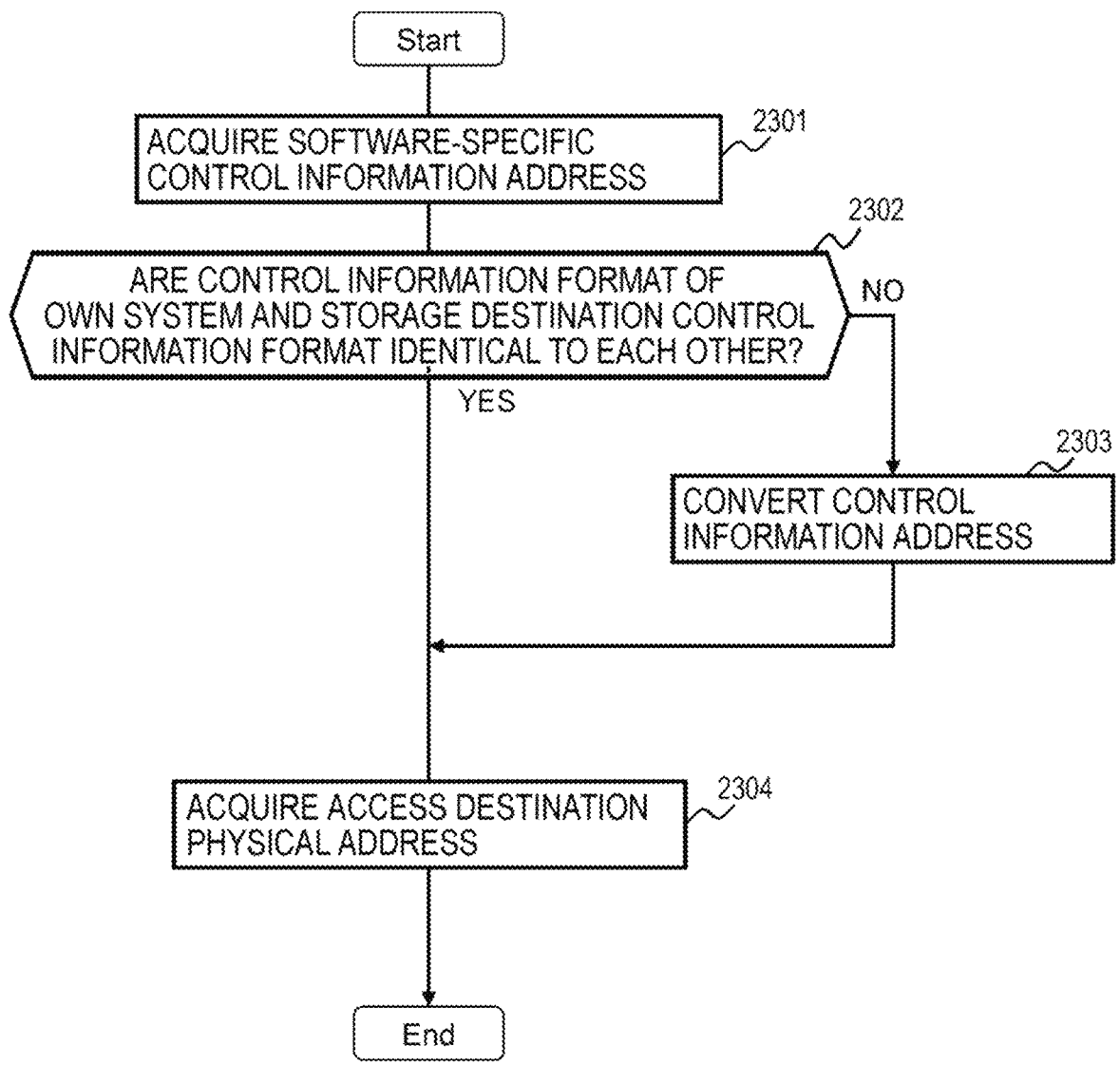

STORAGE SYSTEM AND METHOD OF CONTROLLING STORAGE SYSTEM THAT SET PORTS ASSOCIATED WITH A LOGICAL UNIT

CLAIM OF PRIORITY

The present application claims priority from Japanese patent application JP 2020-163134 filed on Sep. 29, 2020, the content of which is hereby incorporated by reference into this application.

BACKGROUND OF THE INVENTION

1. Field of the Invention

The present invention relates to replacement and upgrade of a storage controller of a storage system that uses a flash memory or a magnetic disk as a storage (storage medium) device.

2. Description of Related Art

In recent years, a large amount of data has been stored in a storage system due to the increase in capacity of a NAND-type flash memory. In addition, the storage system is required to be able to replace the hardware and software with the latest ones without affecting the business of higher-level applications. Generally, the replacement of the storage system requires time for a setting and a data migration process on the new storage system side.

U.S. Pat. No. 9,959,043 discloses an invention for updating software of a storage system without interruption. After the software update, both the new and old data formats are present, and the new data contains references to the data in the old data format. By writing the data in the new data format when the data is updated, the data can be updated to the new data format without stopping reading and writing the data.

U.S. Pat. No. 9,098,211 discloses an invention for performing non-stop data migration between a plurality of storage systems. In order to cause a host to recognize that the system is a single storage system, a virtual storage system, a virtual port, and a virtual logical unit (LUN) over a plurality of storages are configured. By associating the port name and the port address of the physical port of the migration source with the virtual port name and the port address of the migration destination system, the migration to the new storage system can be completed without interruption.

In a dual controller storage system, there is a method for updating hardware of the storage system without interruption. According to this method, a controller can be updated to a new controller without moving the data of the connected drive. In addition, the configuration information of the storage system and the like are maintained. By replacing the storage controllers one by one in order, replacement with new hardware is realized. This is a common method for replacing a controller in the storage system.

U.S. Pat. No. 9,959,043 corresponds to a new data format in the new software while the old data format is maintained, by referring from a new data format to old data when a data format is updated for each data in a logical volume. However, generally, the storage system includes various kinds of control information such as hardware information, LUN configuration information, and internal state management information in addition to the control information indicating the data storage destination. U.S. Pat. No. 9,959,043 does not disclose a method for converting the control information to a format corresponding to new software without interruption.

In U.S. Pat. No. 9,098,211, a port that accepts host commands is switched without interruption, by preparing and associating a virtual port address corresponding to each physical port address of a migration source controller with a physical port of a migration destination controller. However, the storage system generally includes a plurality of controllers for redundancy, and thus a physical port is present in each controller. U.S. Pat. No. 9,098,211 does not disclose a technique relating to which physical port corresponds to which virtual port in a migration destination storage device.

SUMMARY OF THE INVENTION

The present invention solves problems when updating hardware and software of the storage system without interruption as follows.

Regarding the physical port address after the update, it is necessary to set the associated virtual port address so that each LUN corresponds to the redundancy of the multipath configuration set before the update. Specifically, for each LUN, if the multipath configuration is divided and set for two or more controllers before the update, such multipath virtual ports should not be associated with the physical ports of the same controller after the update.

In order to solve at least one of the above problems, a typical example of the invention disclosed in the present application is as follows. That is, a storage system includes a node including a plurality of storage control units including a processor, a memory, and a port; and a storage drive including a storage medium that stores data, in which the plurality of storage control units each request data access and transmit and receive data with respect to a host computer via the plurality of ports, the plurality of processors process data that the host computer inputs and outputs to the storage drive, the plurality of memories store the control information referred by the processors in order to access the data stored in the storage drive, and the storage system transmits the control information stored in the memories of the storage control units to another node including a plurality of storage control units, stores the control information in the memories of the storage control units, and sets ports of the other node in consideration of a relationship between the storage control units and the ports of the nodes, if the other node can access data relating to the control information.

According to an aspect of the present invention, in a multi controller storage system, hardware and software are updated to new hardware and new software without interruption or reducing redundancy and performance.

Problems, configurations and effects other than those described above are clarified by the description of the following examples.

BRIEF DESCRIPTION OF THE DRAWINGS

FIG. 3 is an explanatory diagram illustrating a virtual port address switch of the storage controllers according to the embodiment of the present invention;

FIG. 21 is a flowchart illustrating a FE port switching process executed by the storage controller according to the embodiment of the present invention;

FIG. 22 is a flowchart illustrating an old controller reduction process executed by the storage controller according to the embodiment of the present invention; and FIG. 23 is a flowchart illustrating a control information address conversion process executed by the storage controller according to the embodiment of the present invention.

DESCRIPTION OF EMBODIMENTS

Figure 1:
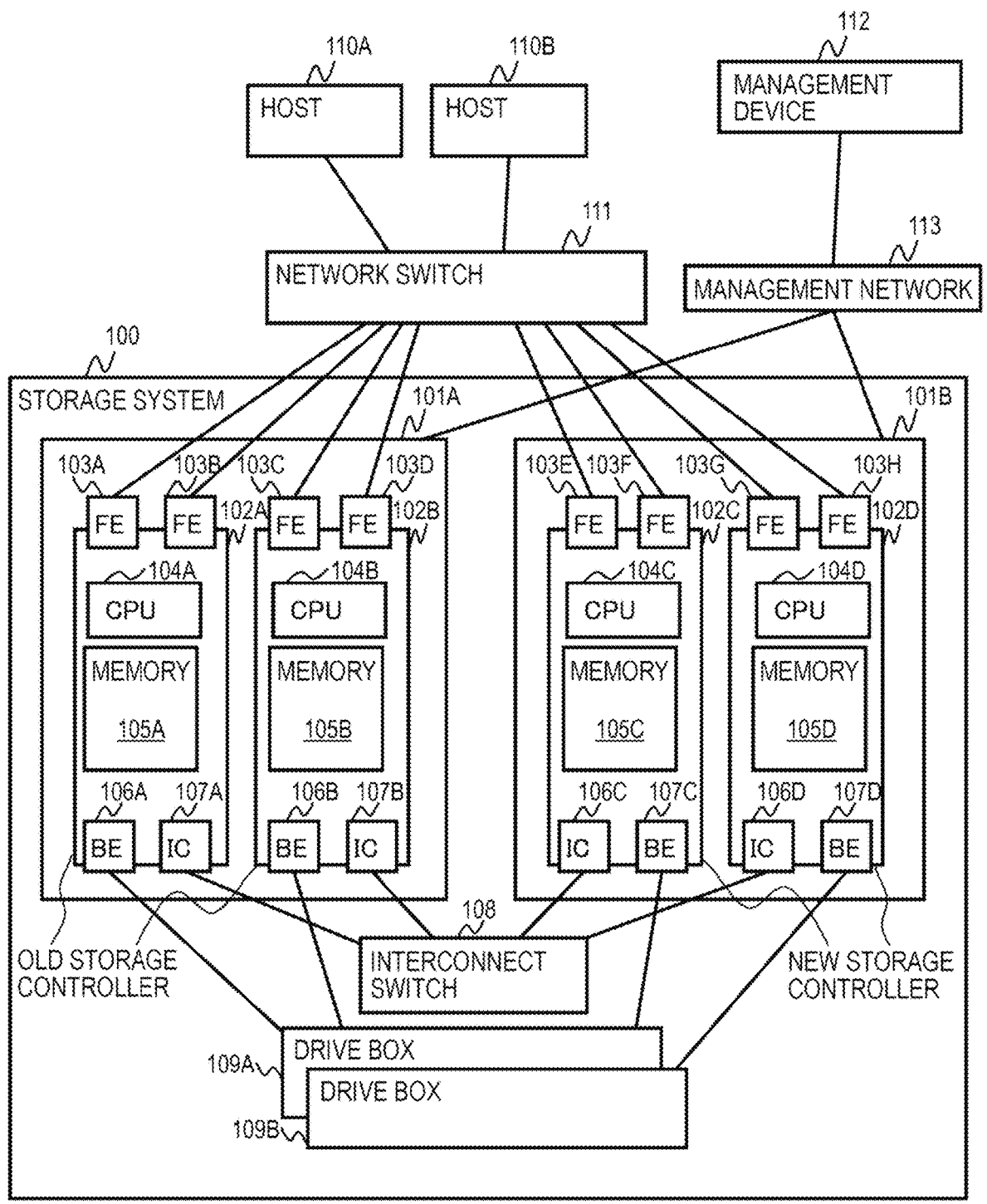
FIG. 1 is a block diagram illustrating a configuration of a storage system according to an embodiment of the present invention.

Hereinafter, examples of the present invention are described with reference to the drawings. In the attached drawings, functionally the same elements may be denoted by the same number. The accompanying drawings illustrate specific embodiments and examples according to the principles of the present invention. These embodiments and examples are provided for the understanding of the present invention and should not be used for a limited interpretation of the present invention.

Further, as described below, the embodiment of the present invention may be implemented by software running on a general-purpose computer, may be implemented by dedicated hardware, or may be implemented by a combination of software and hardware.

In the following, each process in the embodiment of the present invention may be described with a "program" as a subject (acting subject). Since the program performs a determined process by being executed by the processor by using a memory and a communication port (communication control device), the explanation may be considered to be based on the processor. A portion or all of the program may be realized with dedicated hardware or may be modularized. Various programs may be installed in each computer by a program distribution server or a storage medium.

In the following description, the "interface unit" may include at least one of a user interface unit and a communication interface unit. The user interface unit may include at least one I/O device of one or more I/O devices (for example, an input device (for example, a keyboard and a pointing device) and an output device (for example, a display device)) and a display computer. The communication interface unit may include one or more communication interface devices. One or more communication interface devices may be one or more communication interface devices of the same type (for example, one or more Network Interface Card (NIC)) or may be two or more communication interface devices of different types (for example, NIC and Host Bus Adapter (HBA)).

Further, in the following description, a "memory unit" includes one or more memories. At least one memory may be a volatile memory or a non-volatile memory. The memory unit is mainly used during a process by the processor unit.

Further, in the following description, the "processor unit" includes one or more processors. At least one processor is typically a central processing unit (CPU).

Further, in the following description, the information may be described by an expression such as an "xxx table", but the information may be expressed by any data structure. That is, in order to present that the information does not depend on the data structure, the "xxx table" can be referred to as "xxx information". Further, in the following description, the configuration of each table is an example, and one table may be divided into two or more tables, or all or a part of the two or more tables may be one table.

Further, in the following description, if elements of the same type are described without distinction, the common code among reference codes is used, and if elements of the same type are distinguished, the reference code (or the element ID (for example, identification number)) may be used. For example, if a plurality of storage controllers are not distinguished, the storage controllers are described as "storage controllers 102", and if each storage controller is distinguished, the storage controllers are described as "a storage controller 102A" and "a storage controller 102B". The same is applied to other elements (for example, storage nodes 101, front-end network ports 103, CPUs 104, memories 105, back-end network port 106, interconnect network ports 107, drive boxes 109, host computers 110, and the like described below).

Further, in the following description, a "storage system" includes one or more storage devices. At least one storage device may be a general-purpose physical computer. Further, at least one storage device may be a virtual storage device, or Software-Defined anything (SDx) may be performed. As the SDx, for example, a software defined storage (SDS) (an example of a virtual storage device) or a software-defined datacenter (SDDC) can be employed.

Here, an outline of an embodiment of the present invention for solving the above three problems is described.

A storage system to be a target of the present invention is a tightly coupled multi-controller system that has a plurality of storage controllers for redundancy and in which the storage controllers are connected to each other via a broadband and low-latency network such as PCIe or InfiniBand and share control information with each other. The control information is stored in two or more controllers for redundancy.

The present invention solves the above problems by sharing control information while compatibility between old software and new software is maintained.

A method of solving a first problem is described. If the software is updated, it is generally considered that new features are added or the number of resources that can be managed increases. That is, an area for control information used by the new software is not defined in a control information format of old software. Therefore, first, before a new storage controller is expanded, and the new software starts to operate, the old software rewrites the old format control information to the new format control information while continuing the I/O. After the conversion to control information of a new format is completed, the new software accesses the converted new format control information. After the old format control information is rewritten to the new format control information, if the old software accesses the old format control information, the address of the corresponding new format control information is acquired by the address conversion and accesses to the control information after the format conversion.

A method of solving a second problem is described. After the process is switched to the new storage controller, a virtual port name and a virtual port address corresponding to a physical port name and a physical port address of the old storage controller are assigned to the physical port of the new storage (if the switch is performed for the second or more time, a virtual port name and a virtual port address are further assigned to a new storage, instead of the physical port name and the physical port address of the old storage controller). At this point, with respect to LUN in which multipath is defined between the old storage controllers for redundancy, a physical port of another storage controller is associated after migration, the association with the virtual port is generated.

The simplest method is to determine correspondence to virtual ports and physical ports so that physical ports of respective storage controllers in an old storage system are associated with respective storage controllers in a new storage system. If the number of controllers does not change before and after the migration, the ports after migration are set to maintain the relationship between the controllers and the ports. If the number of controllers increases, the ports are set so that a controller that takes over ports from a plurality of controllers before the migration is not generated. If it is confirmed that the ports are not the virtual ports associated with the same LUN, the virtual ports associated with different controllers before the migration may be associated with the same controller after the migration. Accordingly, a switching destination of a port that maintains redundancy after the migration which is the second problem can be selected. Therefore, even in the new storage system, load distribution or a function of failover in a case of failure included in the old storage system can be taken over.

A method of solving a third problem is described. The old storage system includes an empty interconnect network port for connection with a new storage controller in addition to interconnection for connecting storage controllers of the own system to each other. During the update, without reducing the old storage controller, the network port is used to connect the storage controller of the new storage system. In this case, the network port may be directly connected to the storage controller or may be present on a public network switch. In addition, in the same manner, a storage drive box that stores the storage device includes an empty back-end network port for connection to the new storage controller. In a case of the connection with the storage controller, according to the connection between the drive box and the new storage controller, the storage device that is connected to the old storage controller can access from a new storage controller without the old storage controller.

Therefore, for example, a new storage system is expanded in the old storage controller, to form one multi controller storage system. Thereafter, if the migration of the process and the control information is completed, the old storage controller is stopped, and the old storage controller is reduced. Therefore, without reducing the number of the storage controllers and the number of the physical ports which is the third problem, the update of the hardware and the software of the storage is completed.

In the configuration of the multi controller storage system after the new storage system expansion, the new storage software that operates in the new storage controller and the old software that operates in the old storage controller are transparently access the common control information via the network between the storage controllers. In a process performed by the communication between the controllers, the new software operates to satisfy the compatibility with the old software. In this manner, each process performed in the storage system can be performed in any one of the old controller and the new controller, and thus each process can be switched to be performed in a new storage controller without stopping I/O. It is possible to flexibly and quickly respond to a case of maintenance during upgrade, a case of interruption and restoration to the original state, and the like. At the same time, the configuration information such as LUN set before the update, a status such as replication, access frequency information used for tiering a storage medium, and the like can be taken over in the process performed by the new controller as they are.

Hereinafter, examples of the present invention for solving the above problems are described with reference to the drawings.

FIG. 1 is a block diagram illustrating a configuration of a storage system according to an embodiment of the present invention.

A storage system 100 of the present embodiment includes the plurality of storage controllers 102, one or more interconnect switches 108, and one or more drive boxes 109. FIG. 1 illustrates the storage controllers 102A to 102D as examples of the plurality of storage controllers 102. Among these, the storage controllers 102A and 102B are old storage controllers to be reduced from now on, and configure one storage node 101A. Meanwhile, the storage controllers 102C and 102D are new storage controllers to be expanded and configure one storage node 101B.

Each of the storage controllers 102 includes the CPU 104, the memory 105, the front-end network ports (hereinafter, also referred to as FE ports) 103, a back-end network port (hereinafter, also referred to as a BE port) 106, and an interconnect network port (hereinafter, also referred to as an IC port) 107. In the example of FIG. 1, one storage controller 102 includes one CPU 104, one memory 105, two FE ports 103, one BE port 106, and one IC port 107, but the numbers thereof are examples, and any numbers may be used in practice.

The FE ports 103 are connected to a network switch 111. The network switch 111 is connected to one or more host computers 110 (the host computers 110A and 110B in the example of FIG. 1). The storage controllers 102 receive commands such as writing and reading user data from the host computers 110 via the FE ports 103 and the network switch 111 and return responses thereto.

The BE ports 106 are connected to the drive boxes 109. The storage controllers 102 write and read the user data to and from the drive boxes 109 via the BE ports 106.

The drive boxes 109 include the storage media that store data written by the host computers 110. The storage media may be a non-volatile storage medium with a large capacity such as a magnetic disk or a flash memory.

The IC ports 107 are connected to the interconnect switch 108. The interconnect switch 108 is connected to the IC ports 107 of the storage controllers 102. The storage controllers 102 can communicate with other storage controllers 102 in the storage system 100 via the IC ports 107 and the interconnect switch 108, for example, to transmit and receive control information or the like.

The CPUs 104 realize the various functions of the storage controllers 102 by executing the programs stored in the memories 105. Details of the functions realized by the CPU are described below.

The memory 105 includes an area for storing a program executed by the CPU 104, an area for storing control information of the storage controller 102, and an area for storing data to be written or read by the host computers 110. Details of these areas are described below.

Each of the storage controllers 102 is connected to a management device 112 via a management network 113.

Figure 2A:
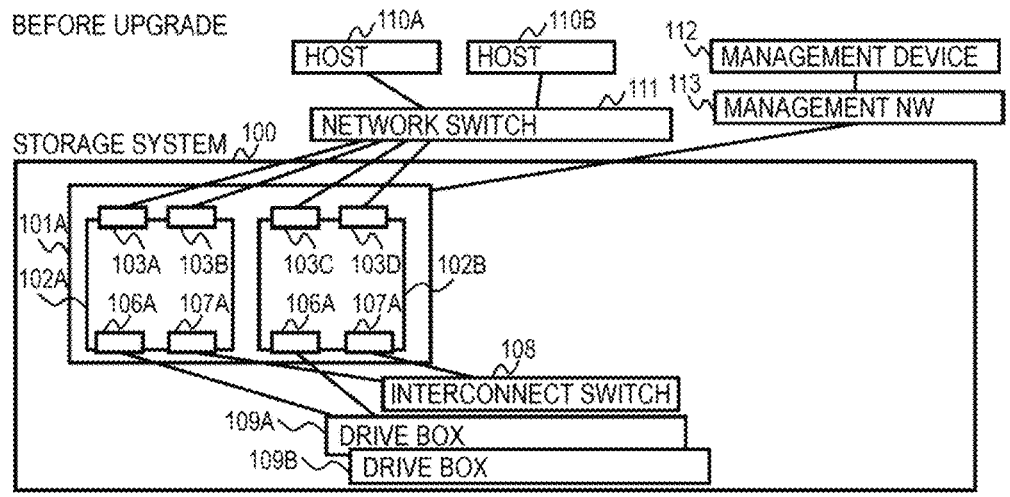
FIGS. 2A to 2C are explanatory diagrams of an outline of procedures for upgrading storage controllers according to the embodiment of the present invention.
Figure 2B:
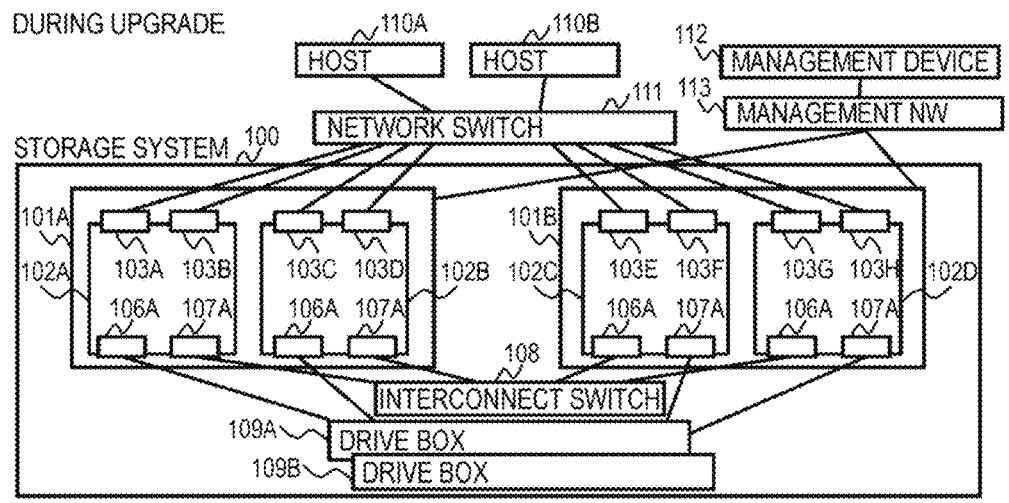
Figure 2C:
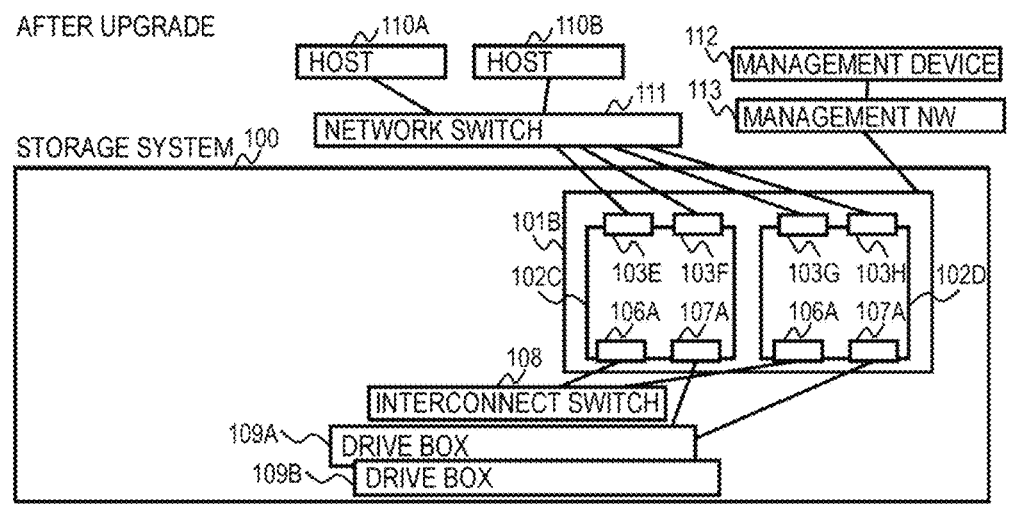

FIGS. 2A to 2C are explanatory diagrams of an outline of procedures for upgrading the storage controllers 102 according to the embodiment of the present invention.

FIG. 2A illustrates the storage system 100 before the upgrade of the storage controllers 102 starts. At this point, the storage system 100 includes the old storage controllers 102A and 102B and does not include the new storage controllers 102C and 102D. At this point, the redundancy is secured by the two storage controllers 102A and 102B.

FIG. 2B illustrates the storage system 100 when the upgrade of the storage controllers 102 is executed. At this point, the storage system 100 includes the new storage controllers 102C and 102D to be expanded in addition to the old storage controllers 102A and 102B. At this point, the redundancy is secured by the four storage controllers 102A to 102D.

FIG. 2C illustrates the storage system 100 after the upgrade of the storage controllers 102 ends. At this point, the old storage controllers 102A and 102B are already reduced, and the storage system 100 includes the new storage controllers 102C and 102D. At this point, the redundancy is secured by the two storage controllers 102C and 102D.

According to the above procedures, even if the upgrade is executed, at least the same redundancy is secured before the start and after the end of the upgrade.

The present invention can be applied to a case where the storage controllers are replaced for the purpose other than the upgrade such as a case where the model of the new storage controllers 102C and 102D is the same as the model of the old storage controllers 102A and 102B. However, in the present embodiment, for example, replacement for upgrading the old storage controllers 102A and 102B to the new storage controllers 102C and 102D of different types, such as a successor model to which a new function is added is described.

FIG. 3 is an explanatory diagram illustrating a virtual port address switch of the storage controllers 102 according to the embodiment of the present invention.

Addresses (for example, world wide names: WWN) of the FE ports 103 accessed by the host computers 110 are taken over from old storage controllers to the new storage controllers by replacement. At this point, takeover destinations are selected so that the addresses of the FE ports 103 of different old storage controllers are taken over to the FE ports 103 of different new storage controllers (in other words, not to be taken over to the FE ports 103 of the same new storage controllers).

In the example of FIG. 3, "AAAA" and "BBBB" which are WWNs of the two FE ports 103A and 103B of the old storage controller 102A are taken over as virtual WWNs of the two FE ports 103E and 103F of the new storage controller 102C. In the same manner, "CCCC" and "DDDD" which are WWNs of the two FE ports 103C and 103D of the old storage controller 102B are taken over as virtual WWNs of the two FE ports 103G and 103H of the new storage controller 102D. Accordingly, at least the same redundancy is secured before the replacement and after the replacement. The host computers 110 can access the storage system 100 in the same manner before the replacement and after the replacement.

Figure 4:
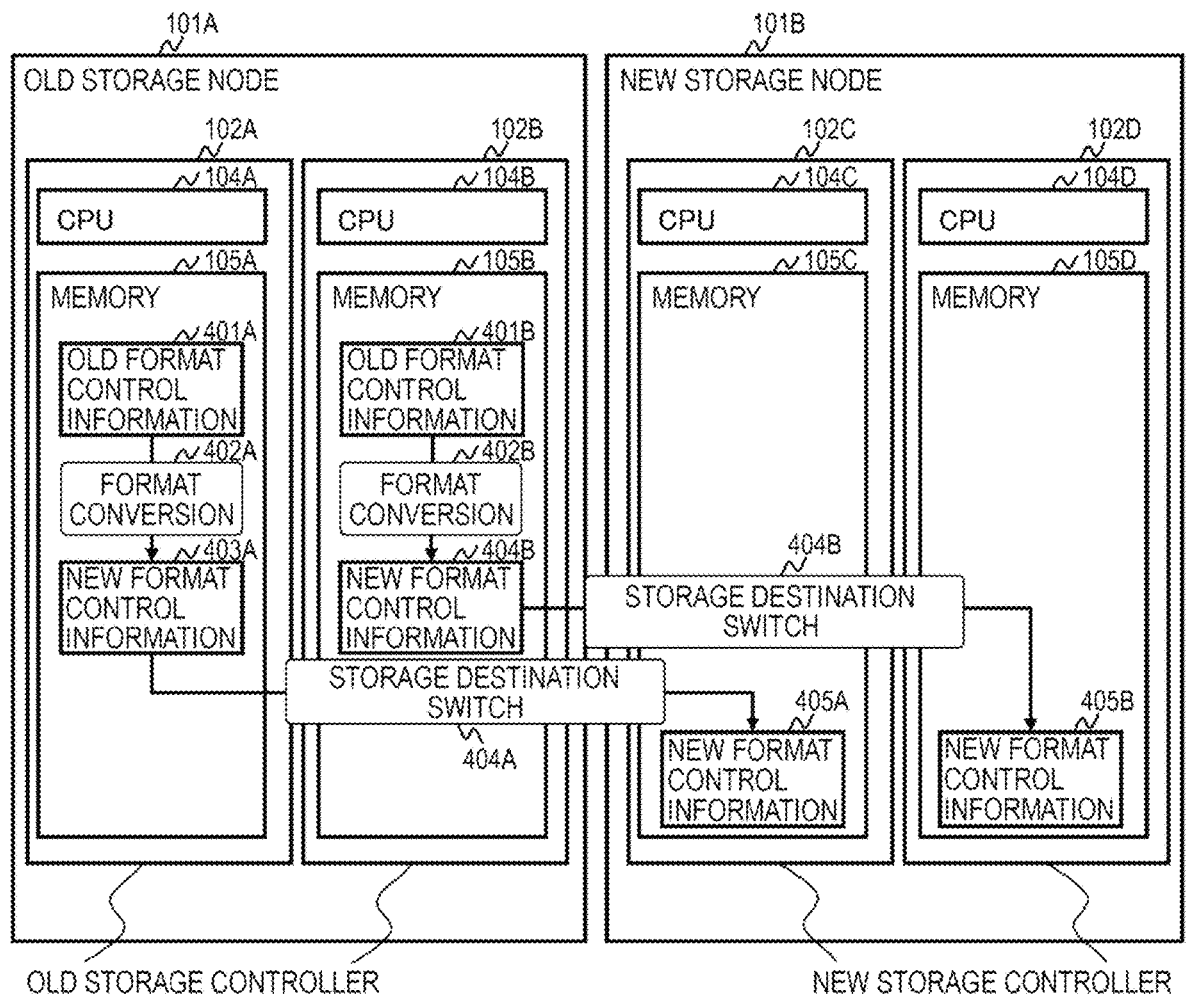
FIG. 4 is an explanatory diagram illustrating procedures of format conversion of control information that is stored by the storage controller according to the embodiment of the present invention.

FIG. 4 is an explanatory diagram illustrating procedures of format conversion of the control information that is stored by the storage controller 102 according to the embodiment of the present invention.

The memory 105A of the old storage controller 102A of the old storage node 101A stores old format control information 401A. Here, the control information refers to the overall information necessary for the storage controllers 102 executing input and output (I/O) of data to the drive boxes 109 according to the commands from the host computers 110 such as information indicating configurations of the drive boxes 109, information indicating states of logical volumes (logical units), and information indicating states such as replication or snapshot, in addition to various kinds of information stored in a shared memory 503 (see FIG. 5) described below.

The CPU 104A executes various processes based on the old format control information 401A before the replacement of the storage controllers starts. If the replacement of the storage controller starts, the CPU 104A performs format conversion of the old format control information 401A (Step 402A) to generate new format control information 403A. Here, a new format is a format appropriate for software that operates in a new storage controller (in this example, the new storage controller 102C) that replaces an old storage controller (in this example, the old storage controller 102A).

At this point, the CPU 104A acquires storage destination addresses of the new format control information 403A and sequentially stores the new format control information 403 generated by performing format conversion of the old format control information 401A in the storage destination addresses. After the conversion and the storage of all areas of the old format control information 401A to the new format control information 403A are completed, if the old storage controller 102A receives commands such as writing and reading user data from the host computers 110, the CPU 104A executes the corresponding command by converting the addresses of the old format control information 401A referred based on the old storage controller 102A based on the storage destination addresses and referring to the new format control information 403A. Details of these processes are described below (see FIG. 18).

Here, it is not necessary to change all control information formats. If the control information appropriate for the old software is also appropriate for the new software as it is, the control information format can be used as it is without change.

Thereafter, the storage destinations are switched (Step 404A). Specifically, the CPU 104A transmits the new format control information 403A to the new storage controller 102C via the IC port 107A and the interconnect switch 108. The CPU 104C of the new storage controller 102C stores the control information received via the IC port 107C in the converted addresses in the memory 105C as new format control information 405A.

The format conversion of the control information and the migration of the control information to the new storage controller 102D in the old storage controller 102B are performed in the same manner. That is, the memory 105B of the old storage controller 102B of the old storage node 101A stores the old format control information 401B. If the replacement of the storage controller starts, the CPU 104B performs format conversion of the old format control information 401B (Step 402B), and generates new format control information 403B. Thereafter, the storage destinations are switched (Step 404B). Specifically, the CPU 104B transmits the new format control information 403B to the new storage controller 102D via the IC port 107B and the interconnect switch 108. The CPU 104D of the new storage controller 102D stores the control information received via the IC port 107D in the converted addresses in the memory 105D as new format control information 405B.

According to the migration of the addresses and the control information of the FE ports 103 from the old storage controller 102A and the like to the new storage controller 102C and the like as illustrated in FIG. 3, the host computers 110 can write and read user data to and from the storage system 100 in the same manner after the replacement and before the replacement of the storage controllers 102. In the following description, the old storage controllers 102 are also referred to as the migration source storage controllers 102, and the new storage controllers 102 are also referred to as the migration destination storage controllers 102.

Figure 5:
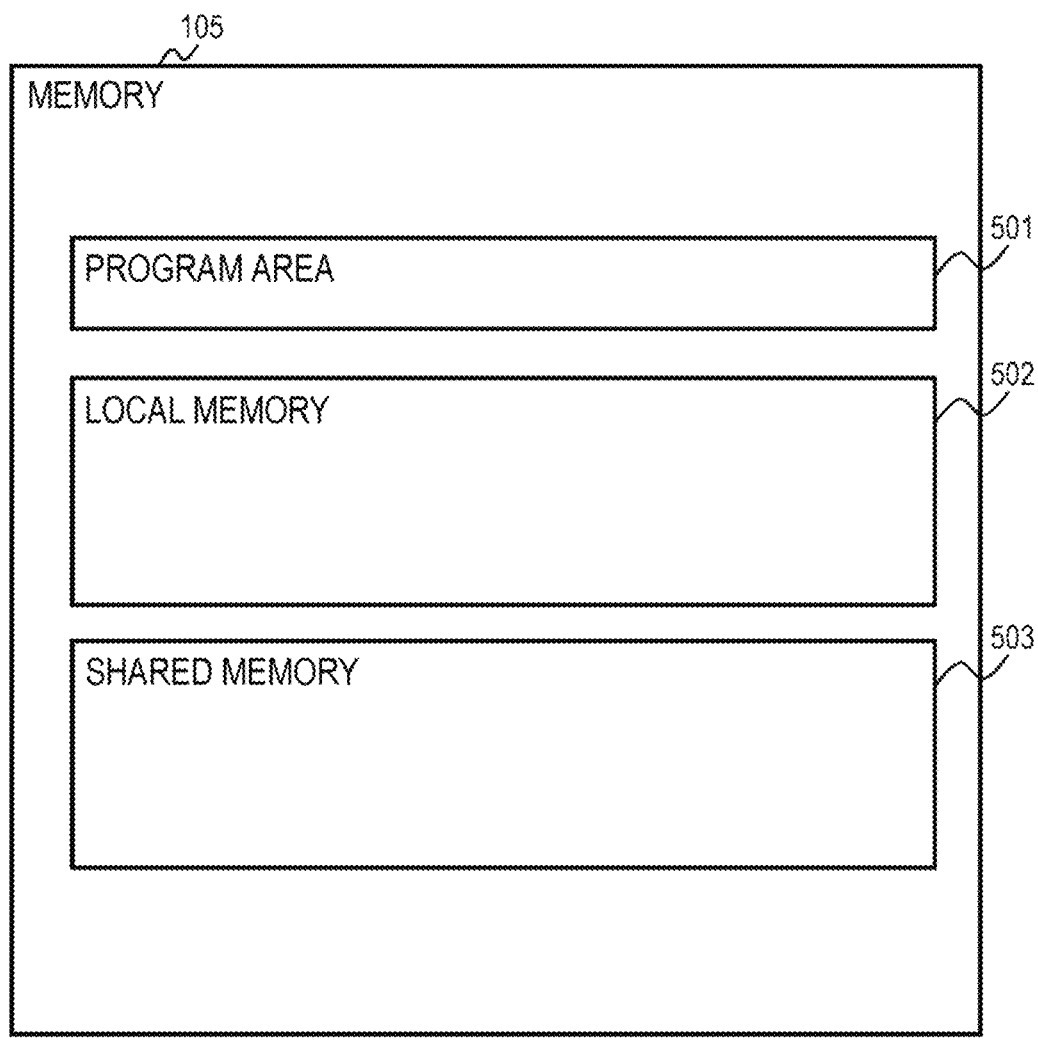
FIG. 5 is an explanatory diagram illustrating a configuration of the memory included in the storage controller according to the embodiment of the present invention.

FIG. 5 is an explanatory diagram illustrating a configuration of the memory 105 included in the storage controller 102 according to the embodiment of the present invention.

The memory 105 includes a program area 501, a local memory 502, and the shared memory 503, as storage areas. Details of these are described below.

Figure 6:
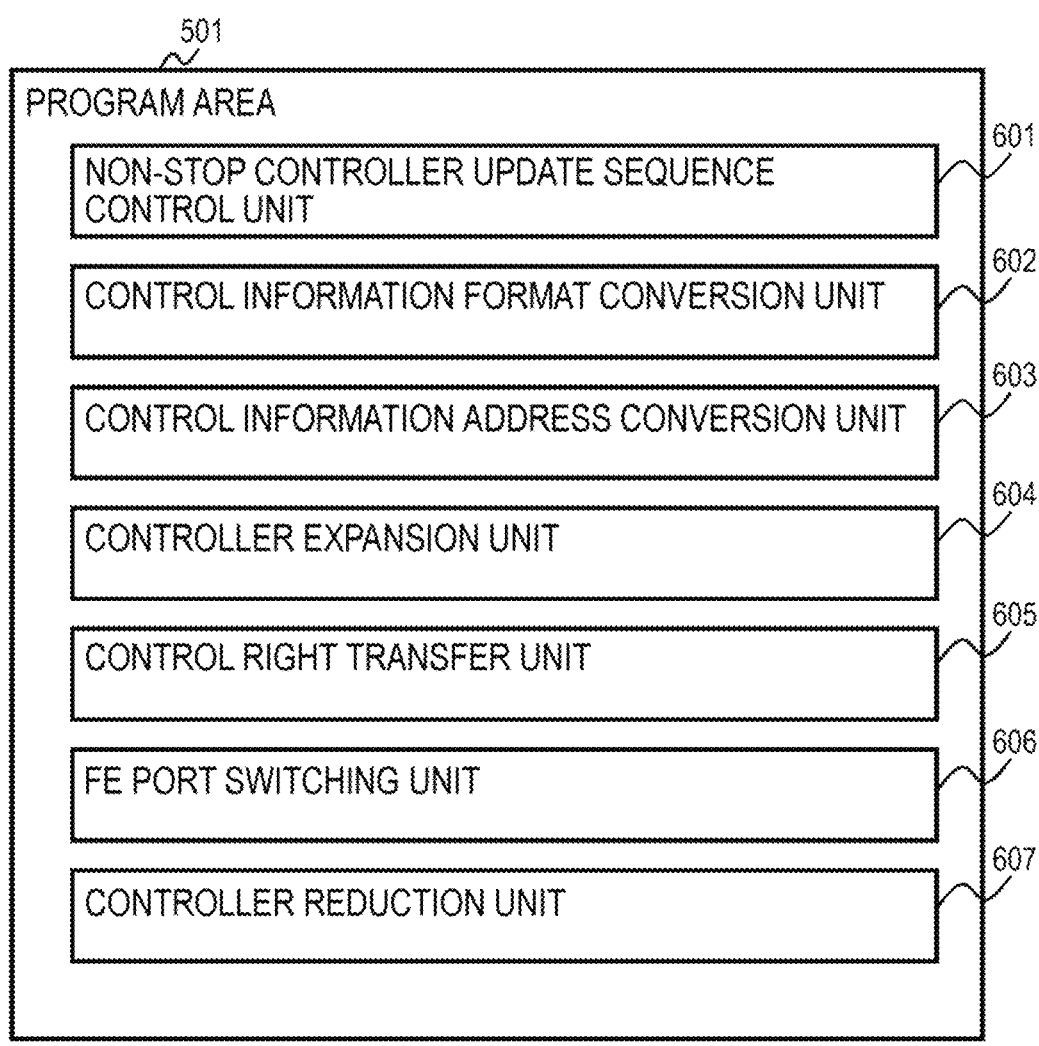
FIG. 6 is an explanatory diagram illustrating a configuration of a program area in the memory of the storage controller according to the embodiment of the present invention.

FIG. 6 is an explanatory diagram illustrating a configuration of the program area 501 in the memory 105 of the storage controller 102 according to the embodiment of the present invention.

A non-stop controller update sequence control unit 601, a control information format conversion unit 602, a control information address conversion unit 603, a controller expansion unit 604, a control right transfer unit 605, a FE port switching unit 606, and a controller reduction unit 607 are stored in the program area 501. All of these are programs that are stored in the memory 105 and executed by the CPU 104. In the following description, the processes executed by each unit are executed by the CPU 104 according to the program in practice.

The non-stop controller update sequence control unit 601 controls a sequence of the replacement of the storage controllers 102 of the present embodiment. The control information format conversion unit 602 performs format conversion from the old format control information to the new format control information (Steps 402A and 402B of FIG. 4). The control information address conversion unit 603 converts addresses of areas in which old format control information is stored in the memory 105 to addresses of areas in which new format control information is stored.

The controller expansion unit 604 performs a process in a case of expansion of the new storage controllers 102. The control right transfer unit 605 performs a process relating to the transfer of the control right of the storage controllers 102. The FE port switching unit 606 performs a process relating to the switch of the FE ports 103 that receive commands from the host computers 110. The controller reduction unit 607 performs a process in a case of the reduction of the old storage controllers 102.

Figure 7:
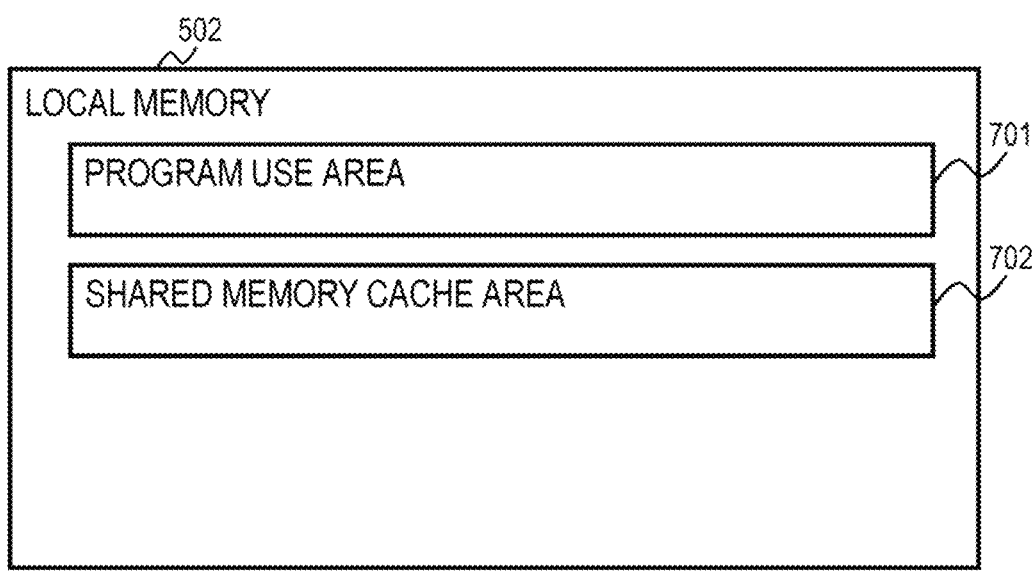
FIG. 7 is an explanatory diagram illustrating a configuration of a local memory in the memory of the storage controller according to the embodiment of the present invention.

FIG. 7 is an explanatory diagram illustrating a configuration of the local memory 502 in the memory 105 of the storage controller 102 according to the embodiment of the present invention.

The local memory 502 includes a program use area 701 and a shared memory cache area 702. The program use area 701 is an area used when the CPU 104 executes a program. The shared memory cache area 702 is an area for caching the data in the shared memory 503 on the local memory 502, in order to speed up memory access.

Figure 8:
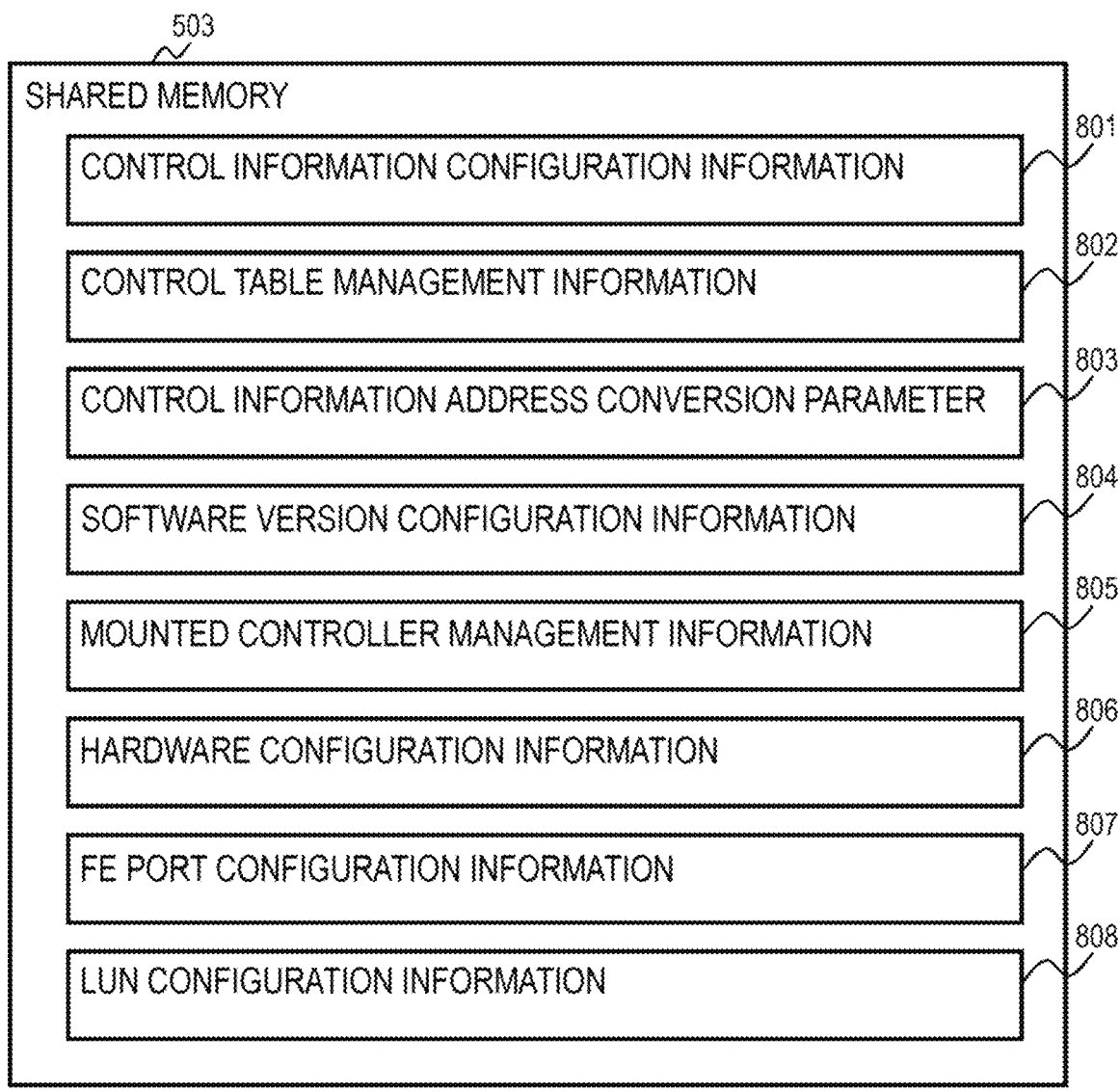
FIG. 8 is an explanatory diagram illustrating a configuration of a shared memory in the memory of the storage controller according to the embodiment of the present invention.

FIG. 8 is an explanatory diagram illustrating a configuration of the shared memory 503 in the memory 105 of the storage controller 102 according to the embodiment of the present invention.

Control information configuration information 801, control table management information 802, a control information address conversion parameter 803, software version configuration information 804, mounted controller management information 805, hardware configuration information 806, FE port configuration information 807, and LUN configuration information 808 are stored in the shared memory 503. Details of these are described below (see FIGS. 9 to 16).

Figure 9:
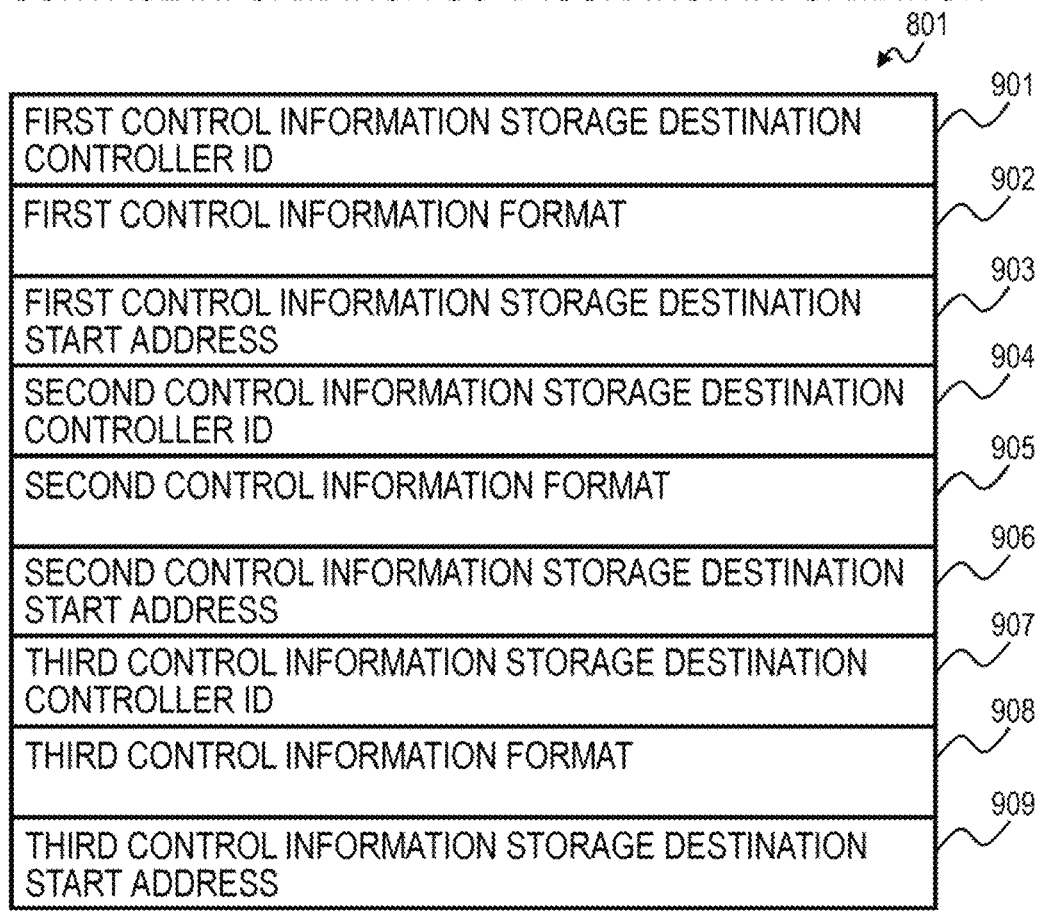
FIG. 9 is an explanatory diagram illustrating a configuration of control information configuration information stored in the memory of the storage controller according to the embodiment of the present invention.

FIG. 9 is an explanatory diagram illustrating a configuration of the control information configuration information 801 stored in the memory 105 of the storage controller 102 according to the embodiment of the present invention.

The control information configuration information 801 includes a first control information storage destination controller ID 901, the first control information format 902, a first control information storage destination start address 903, a second control information storage destination controller ID 904, a second control information format 905, a second control information storage destination start address 906, a third control information storage destination controller ID 907, a third control information format 908, and a third control information storage destination start address 909.

The first control information storage destination controller ID 901, the first control information format 902, and the first control information storage destination start address 903 are identification information of the storage controller in which the first control information is stored, a first control information format thereof, and a start address of the area in the memory 105 in which the first control information is stored, respectively. With respect to the second control information and the third control information, information is stored in the same manner as described above, from the second control information storage destination controller ID 904 to the third control information storage destination start address 909.

For example, the first control information may be the old format control information 401A illustrated in FIG. 4, and the second control information may be the old format control information 401B. In this case, the first control information storage destination controller ID 901 is identification information of the storage controller 102A in which the control information 401A is stored, the first control information format 902 is a format of the control information 401A, and the first control information storage destination start address 903 is a start address of an area of the memory 105A in which the control information 401A is stored. In the same manner, the second control information storage destination controller ID 904, the second control information format 905, and the second control information storage destination start address 906 are information relating to the old format control information 401B.

The third control information is used as a temporal storage destination for the format conversion and the storage destination controller switch. During format conversion and copying, the first to third control information is written. If the switch is completed, the third control information is copied to the first or second control information to be switched, and the third control information is cleared.

Figure 10:
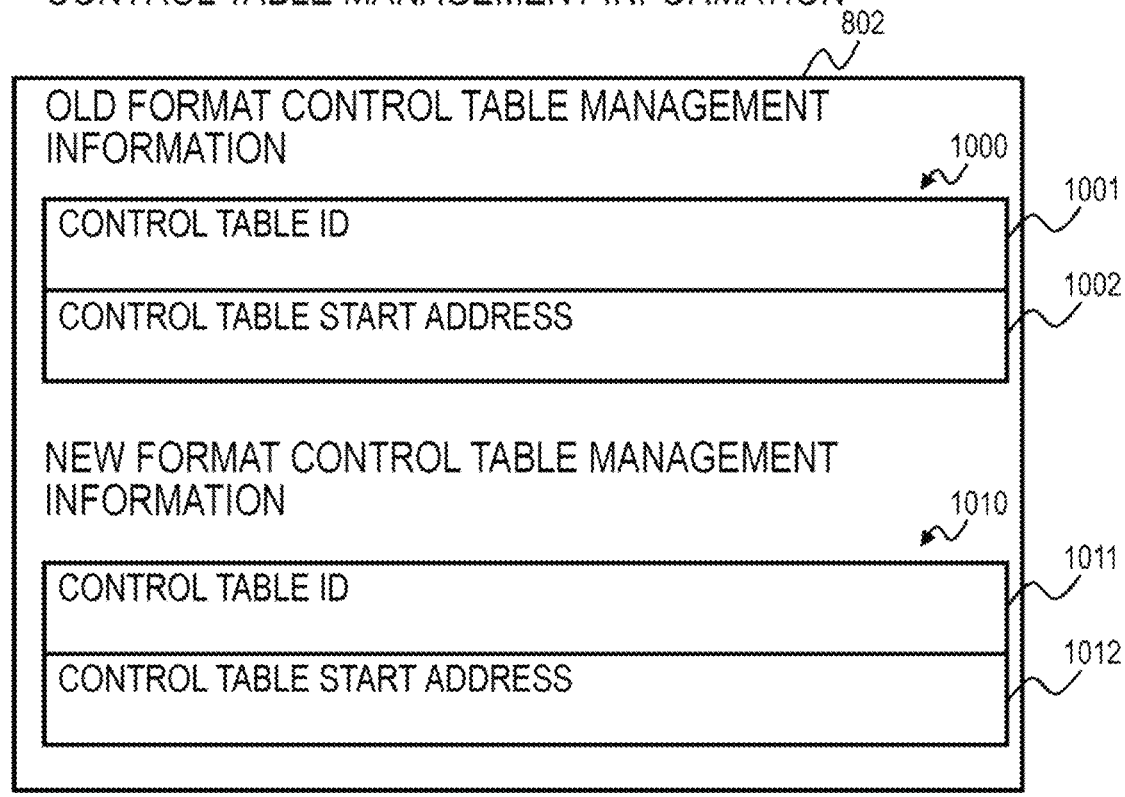
FIG. 10 is an explanatory diagram illustrating a configuration of control table management information stored in the memory of the storage controller according to the embodiment of the present invention.

FIG. 10 is an explanatory diagram illustrating a configuration of the control table management information 802 stored in the memory 105 of the storage controller 102 according to the embodiment of the present invention.

The control table management information 802 includes old format control table management information 1000 and new format control table management information 1010.

The old format control table management information 1000 includes a control table ID 1001 and a control table start address 1002. For example, in a case of the control table management information 802 stored by the storage controller 102A, the identification information and the start address of the control table included in the old format control information 401A are stored as the control table ID 1001 and the control table start address 1002.

The new format control table management information 1010 includes a control table ID 1011 and a control table start address 1012. For example, in a case of the control table management information 802 stored by the storage controller 102A, the identification information and the start address of the control table included in the new format control information 401C after the format is converted are stored as the control table ID 1011 and the control table start address 1012.

In practice, since the control information includes various control tables, control table IDs and control table start addresses are stored for each of these control tables.

Figure 11:
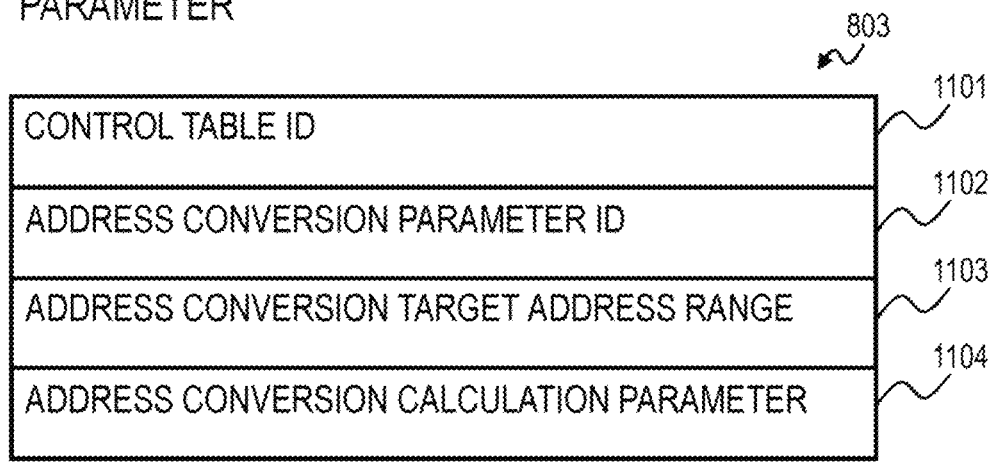
FIG. 11 is an explanatory diagram illustrating a configuration of a control information address conversion parameter stored in the memory of the storage controller according to the embodiment of the present invention.

FIG. 11 is an explanatory diagram illustrating a configuration of the control information address conversion parameter 803 stored in the memory 105 of the storage controller 102 according to the embodiment of the present invention.

The control information address conversion parameter 803 includes a control table ID 1101, an address conversion parameter ID 1102, an address conversion target address range 1103, and an address conversion calculation parameter 1104.

The control table ID 1101 is identification information of each control table. The address conversion parameter ID 1102 is identification information of the calculation parameter for converting the address of each control table. The address conversion target address range 1103 is a range of the address to be converted. The address conversion calculation parameter 1104 is a calculation parameter for converting the address of each control table.

Figure 12:
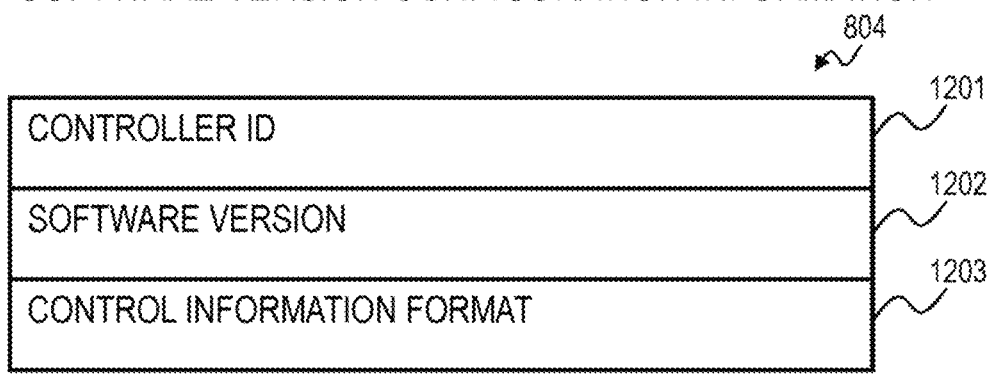
FIG. 12 is an explanatory diagram illustrating a configuration of software version configuration information stored in the memory of the storage controller according to the embodiment of the present invention.

FIG. 12 is an explanatory diagram illustrating a configuration of the software version configuration information 804 stored in the memory 105 of the storage controller 102 according to the embodiment of the present invention.

The software version configuration information 804 includes a controller ID 1201, a software version 1202, and a control information format 1203.

The controller ID 1201 is identification information of each storage controller 102. The software version 1202 is a version of the software used in each storage controller 102. The control information format 1203 is a format of the control information used by the software of the corresponding version.

Figure 13:
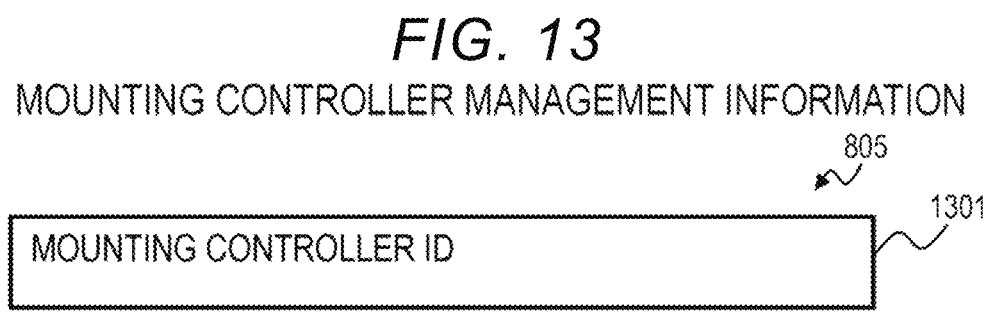
FIG. 13 is an explanatory diagram illustrating a configuration of mounted controller management information stored in the memory of the storage controller according to the embodiment of the present invention.

FIG. 13 is an explanatory diagram illustrating a configuration of the mounted controller management information 805 stored in the memory 105 of the storage controller 102 according to the embodiment of the present invention.

The mounted controller management information 805 includes a mounted controller ID 1301. The mounted controller ID 1301 is identification information of the storage controller 102 mounted on the storage system 100 in a state in which a process such as input and output (I/O) of data can be executed.

For example, in a state before the new storage controllers 102C and 102D are expanded as illustrated in FIG. 2A, the identification information of the old storage controllers 102A and 102B is stored as the mounted controller ID 1301. When the new storage controllers 102C and 102D are mounted as illustrated in FIG. 2B, and the process of the upgrade is executed, the identification information of the storage controllers 102A to 102D is stored as the mounted controller ID 1301. In a state after the old storage controllers 102A and 102B are reduced as illustrated in FIG. 2C, the identification information of the new storage controllers 102C and 102C is stored as the mounted controller ID 1301.

Figure 14:
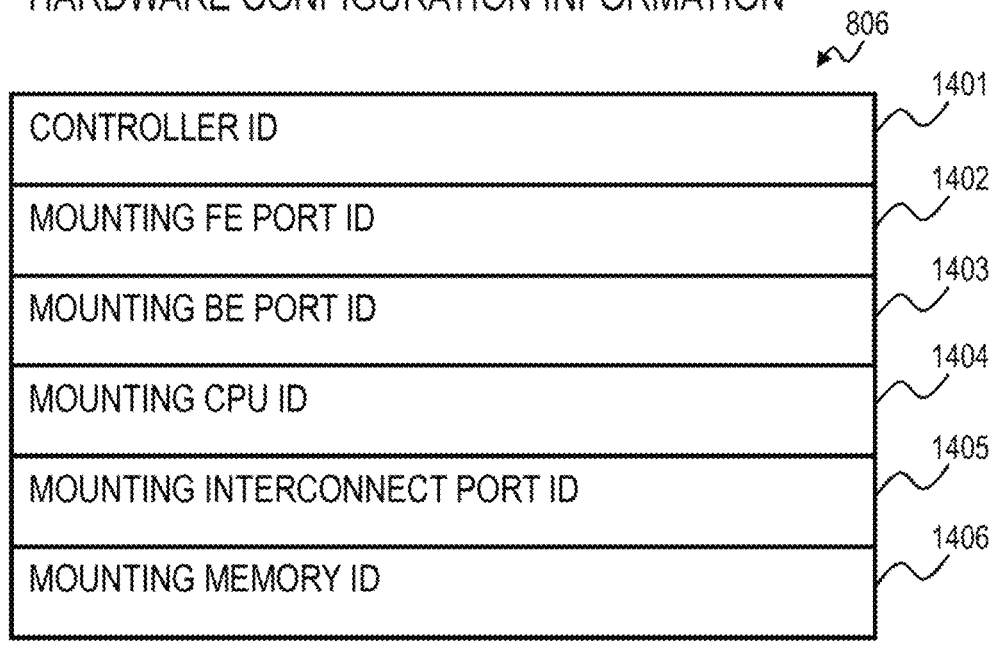
FIG. 14 is an explanatory diagram illustrating a configuration of hardware configuration information stored in the memory of the storage controller according to the embodiment of the present invention.

FIG. 14 is an explanatory diagram illustrating a configuration of the hardware configuration information 806 stored in the memory 105 of the storage controller 102 according to the embodiment of the present invention.

The hardware configuration information 806 includes a controller ID 1401, a mounted FE port ID 1402, a mounted BE port ID 1403, a mounted CPU ID 1404, a mounted interconnect port ID 1405, and a mounted memory ID 1406.

The controller ID 1401 is identification information of each storage controller 102. The mounted FE port ID 1402, the mounted BE port ID 1403, the mounted CPU ID 1404, the mounted interconnect port ID 1405, and the mounted memory ID 1406 are identification information of the FE port 103, the BE port 106, the CPU 104, the IC port 107, and the memory 105 which are mounted on each storage controller 102, respectively.

Figure 15:
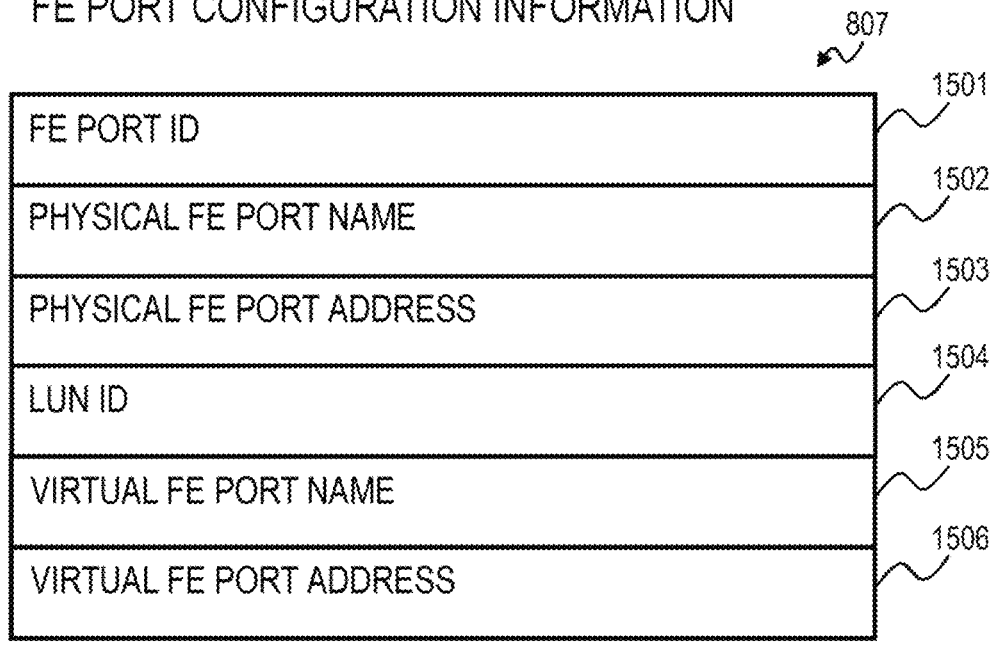
FIG. 15 is an explanatory diagram illustrating a configuration of FE port configuration information stored in the memory of the storage controller according to the embodiment of the present invention.

FIG. 15 is an explanatory diagram illustrating a configuration of the FE port configuration information 807 stored in the memory 105 of the storage controller 102 according to the embodiment of the present invention.

The FE port configuration information 807 is information illustrating a configuration of each FE port 103. Each storage controller 102 stores the FE port configuration information 807 relating to all FE ports included in the corresponding storage controller 102. The FE port configuration information 807 includes a FE port ID 1501, a physical FE port name 1502, a physical FE port address 1503, an LUN ID 1504, a virtual FE port name 1505, and a virtual FE port address 1506.

The FE port ID 1501 is identification information of each FE port 103. The physical FE port name 1502 and the physical FE port address 1503 are physical identification information of each FE port 103 and are determined according to mounting slot positions.

The LUN ID 1504 is information for identifying a logical unit in which a path to the host computer 110 via each FE port is set. Paths to the plurality of logical units may be set to one FE port 103. In such a case, a plurality of values are stored as the LUN ID 1504.

The virtual FE port name 1505 and the virtual FE port address 1506 are identification information of each FE port 103 provided to the host computer 110, and any values can be set, if necessary.

For example, the WWNs of the FE ports 103A to 103D of the old storage node 101A illustrated in FIG. 3 may be the physical FE port name 1502 or the physical FE port address 1503 and may be the virtual FE port name 1505 or the virtual FE port address 1506. The WWNs of the FE ports 103E to 103H of the new storage node 101B are the virtual FE port names 1505 or the virtual FE port addresses 1506.

Figure 16:
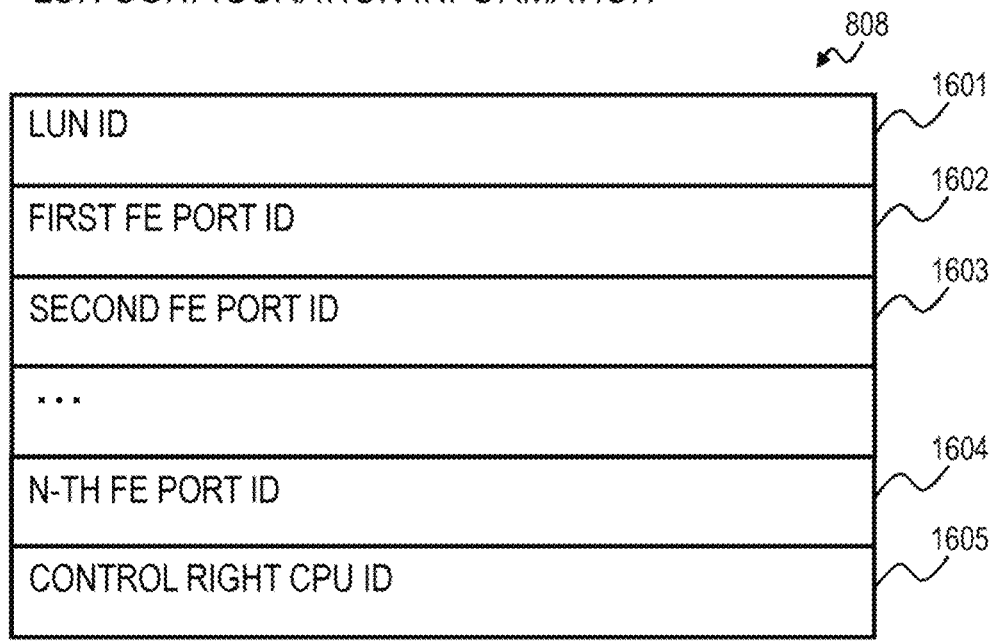
FIG. 16 is an explanatory diagram of a configuration of LUN configuration information stored in the memory of the storage controller according to the embodiment of the present invention.

FIG. 16 is an explanatory diagram of a configuration of the LUN configuration information 808 stored in the memory 105 of the storage controller 102 according to the embodiment of the present invention.

The LUN configuration information 808 is information illustrating a configuration of each logical unit, and one item of the LUN configuration information 808 is stored for one logical unit. The LUN configuration information 808 includes a LUN ID 1601, a first FE port ID 1602, a second FE port ID 1603, an n-th FE port ID 1604, and a control right CPU ID 1605.

The LUN ID 1601 is identification information of each logical unit. The first FE port ID 1602 to the n-th FE port ID 1604 are identification information of FE ports in which paths to each logical unit are set. The control right CPU ID 1605 is identification information of the CPU 104 that exclusively accesses the control information according to the I/O process to each logical unit in order to speed up the I/O process.

Each logical unit is associated with FE ports belonging to a plurality of different storage controllers for the purpose of the load distribution or failover in a case of failure.

Subsequently, a process executed by the storage controller 102 is described with reference to a flowchart. The following process is realized by the CPU 104 of the storage controller 102 executing a program stored in the program area 501 in the memory 105.

Figure 17:
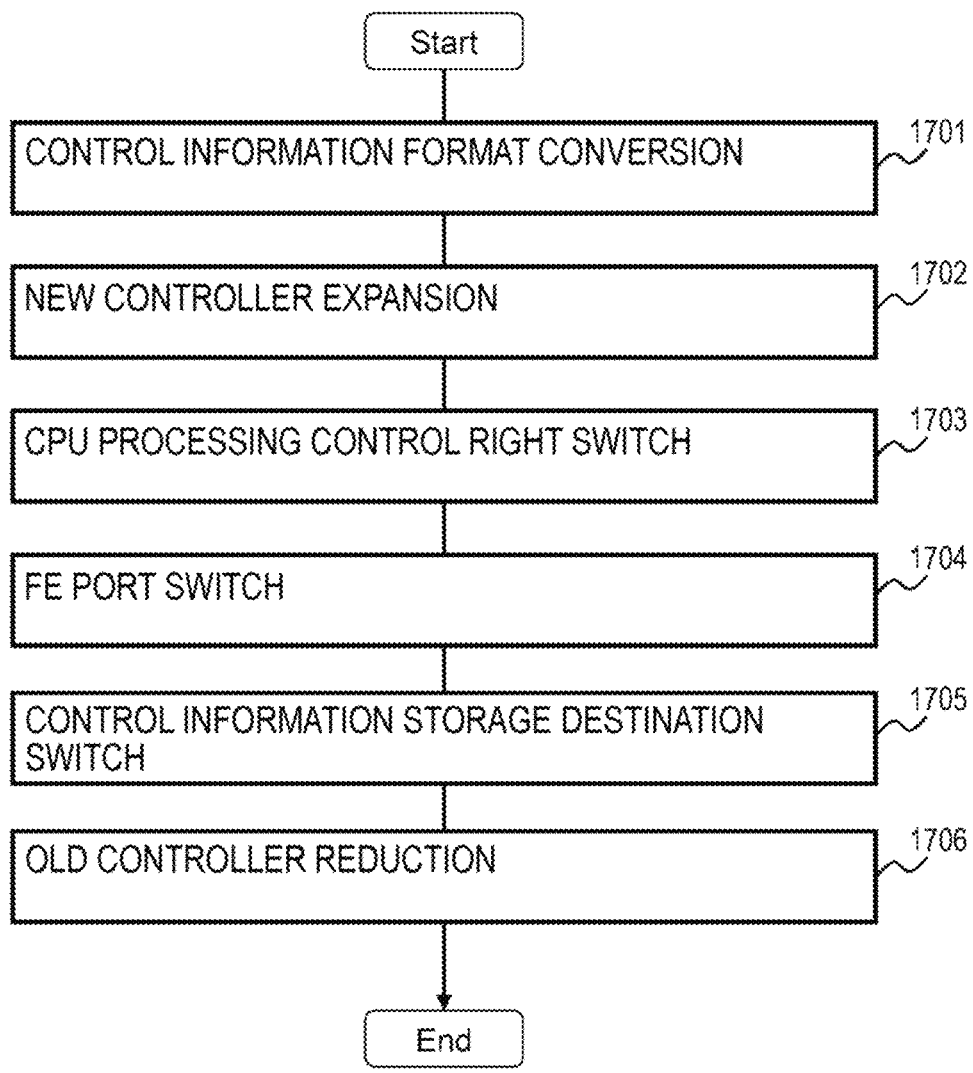
FIG. 17 is a flowchart illustrating the entire controller update process executed by the storage controller according to the embodiment of the present invention.

FIG. 17 is a flowchart illustrating the entire controller update process executed by the storage controller 102 according to the embodiment of the present invention.

First, the storage controller 102 executes a control information format conversion process (Step 1701). Details of this process are described below (see FIG. 18).

Subsequently, the storage controller 102 executes the new controller expansion process (Step 1702). Details of this process are described below (see FIG. 19).

Subsequently, the storage controller 102 executes a CPU processing control right switching process (Step 1703). Details of this process are described below (see FIG. 20).

Subsequently, the storage controller 102 executes a FE port switching process (Step 1704). Details of this process are described below (see FIG. 21).

Subsequently, the storage controller 102 executes the control information storage destination switching process (Step 1705). This corresponds to the storage destination switch of FIG. 4 (Steps 404A and 404B) and the control information of which the format is converted is stored in the new storage controller 102.

Subsequently, the storage controller 102 executes the old controller reduction process (Step 1706). Details of this process are described below (see FIG. 22).

Figure 18:
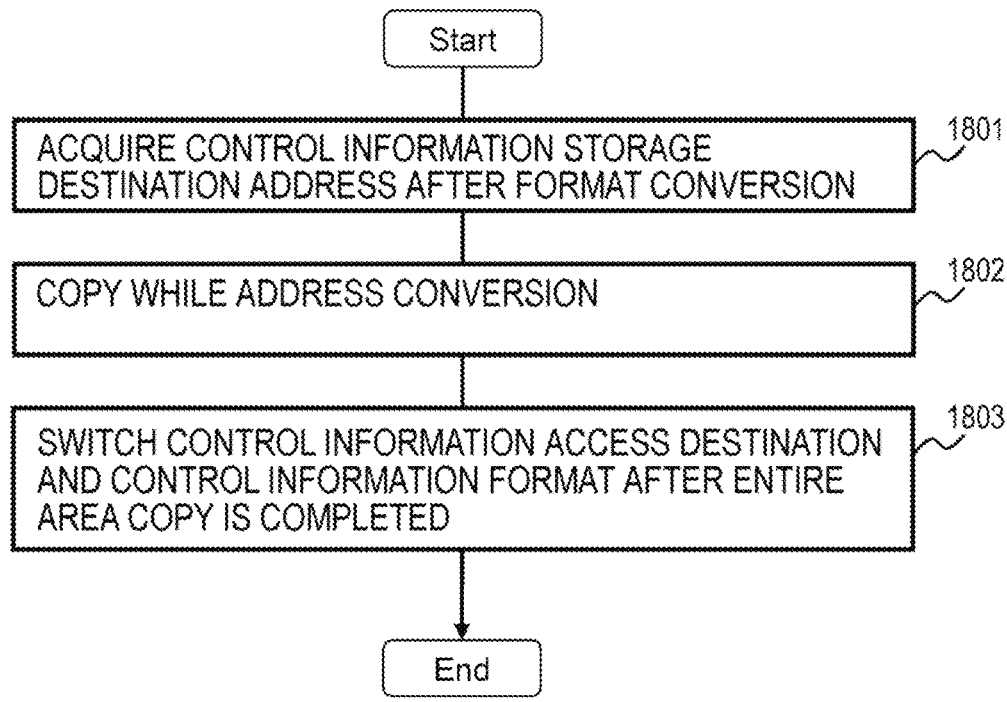
FIG. 18 is a flowchart illustrating a control information format conversion process executed by the storage controller according to the embodiment of the present invention.

FIG. 18 is a flowchart illustrating a control information format conversion process executed by the storage controller 102 according to the embodiment of the present invention.

The control information format conversion process illustrated in FIG. 18 is executed by the old storage controllers 102 (the storage controllers 102A and 102B in the example of FIG. 4) which are the migration sources. First, the storage controller 102 refers to the control information configuration information 801 and the control table management information 802 and acquires the storage destination address of the control information after the format conversion (Step 1801). For example, if a third control information storage destination start address of the control information configuration information 801 is a storage destination start address of the control information (the new format control information 403A or 403B in the example of FIG. 4) after the format conversion in the memory 105 of the old storage controller 102, the storage controller 102 may acquire the storage destination start address.

Subsequently, the storage controller 102 converts the control information format while converting the address according to the address acquired in Step 1801 and stores the format in the memory 105 (Step 1802). This corresponds to Step 402A and 402B of FIG. 4.

With respect to all areas of the control information, if a process of converting a format and storing the format in the memory 105 is completed, the storage controller 102 switches the control information access destination and the control information format (Step 1803). Thereafter, if the old storage controller 102 receives a writing command or the like from the host computer 110, the old storage controller 102 accesses the new format control information in order to execute this. A process executed in such a case is described below (see FIG. 23).

In the above, the control information format conversion process is completed.

Figure 19:
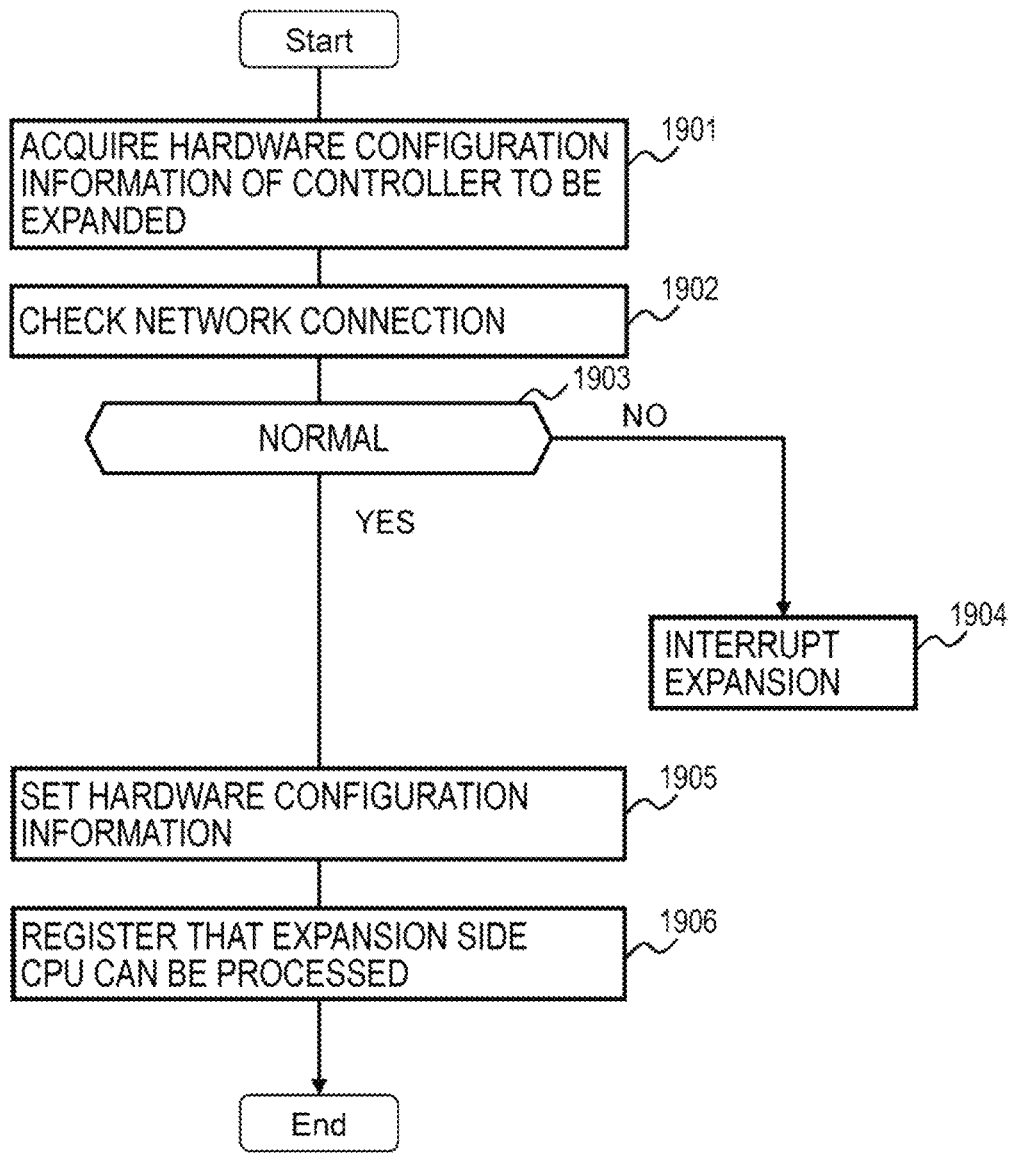
FIG. 19 is a flowchart illustrating a new controller expansion process executed by the storage controller according to the embodiment of the present invention.

FIG. 19 is a flowchart illustrating a new controller expansion process executed by the storage controller 102 according to the embodiment of the present invention.

First, the storage controller 102 acquires the hardware configuration information of the storage controller 102 of the own system (Step 1901). Specifically, the storage controller 102 acquires the information corresponding to each item of the hardware configuration information 806 from hardware configuration elements such as the FE port 103, the CPU 104, the memory 105, the BE port 106, the IC port 107, and the like in the storage controller 102 of the own system.

Subsequently, the storage controller 102 checks the network connection (Step 1902). For example, the storage controller 102 confirms the connection with the network switch 111, the interconnect switch 108, the drive boxes 109, and the like.

Subsequently, the storage controller 102 determines whether the result of the network connection check is normal (Step 1903). If the result is not normal, the storage controller 102 interrupts the new controller expansion process (Step 1904).

If the result of the network connection check is normal, the storage controller 102 sets the hardware configuration information (Step 1905). Specifically, the storage controller 102 stores the information acquired in Step 1901 in the memory 105 as the hardware configuration information 806.

Subsequently, the storage controller 102 registers that an expansion side CPU process can be performed (Step 1906). Accordingly, the identification information of the corresponding storage controller 102 is added to the mounted controller ID 1301 of the mounted controller management information 805 on the shared memory 503.

In the above, the new controller expansion process is completed.

Figure 20:
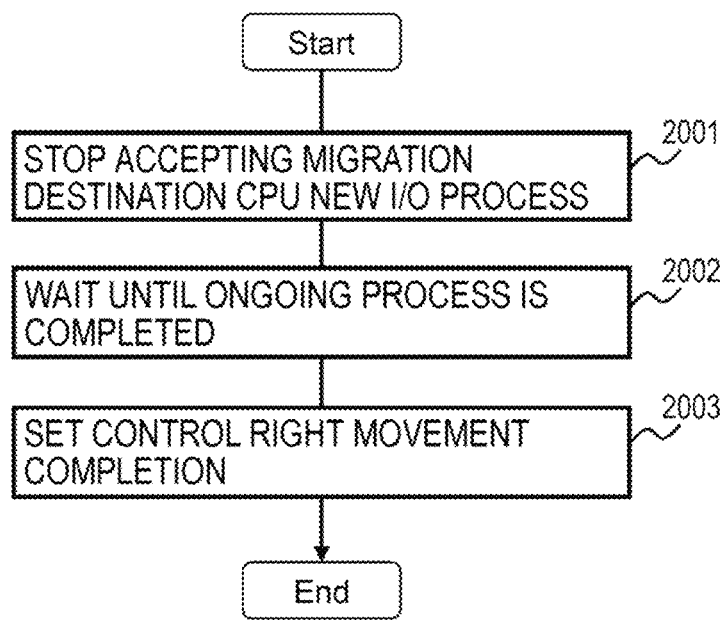
FIG. 20 is a flowchart illustrating a CPU processing control right switching process executed by the storage controller according to the embodiment of the present invention.

FIG. 20 is a flowchart illustrating a CPU processing control right switching process executed by the storage controller 102 according to the embodiment of the present invention.

First, the old storage controllers 102 (the storage controllers 102A and 102B in the example of FIG. 4) which is the migration source stops receiving a new I/O process from the host computer 110 (Step 2001).

Subsequently, the old storage controller 102 waits for the completion of the already received ongoing I/O process (Step 2002).

If the ongoing I/O process is completed, the storage controller 102 sets the transfer of the control right CPU (Step 2003). Specifically, from the LUN configuration information 808 stored by the storage controller 102, a value of the control right CPU ID 1605 of the LUN configuration information 808 relating to the logical unit of which the control right is possessed by the CPU 104 of the migration source storage controller 102 is rewritten to the identification information of the CPU 104 of the migration destination storage controller 102. For example, if the migration source is the storage controller 102A, and the migration destination is the storage controller 102C, the value of the control right CPU ID 1605 is rewritten from the identification information of the CPU 104A to the identification information of the CPU 104C.

In the above, the CPU processing control right switching process is completed.

FIG. 21 is a flowchart illustrating a FE port switching process executed by the storage controller 102 according to the embodiment of the present invention.

First, the storage controller 102 selects the identification information of the migration source storage controller 102 and the migration destination storage controller 102 (Steps 2101 and 2102). For example, if the replacement illustrated in FIGS. 2 to 4 is performed, the storage controller 102A as the migration source and the storage controller 102C as the migration destination may be selected, and the storage controller 102B as the migration source and the storage controller 102D as the migration destination may be selected.

Subsequently, the storage controller 102 determines the FE port of the migration destination storage controller 102 corresponding to each FE port 103 of the migration source storage controller 102 (Step 2103). For example, if the replacement illustrated in FIGS. 2 to 4 is performed, the FE ports 103E to 103H corresponding to the FE ports 103A to 103D may be determined, respectively.

In such a case, the FE ports 103A and 103B of the same migration source storage controller 102A are associated with the FE ports 103E and 103F of the same migration destination storage controller 102C. Also, the FE ports 103C and 103D of the migration source storage controller 102B different from the migration source storage controller 102A are associated with the FE ports 103G and 103H of the migration destination storage controller 102D different from the migration destination storage controller 102C.

In this manner, the FE port 103 mounted on the different migration source storage controller 102 is associated with the FE port 103 mounted on the different migration destination storage controller 102. That is, the FE port 103 mounted on the different migration source storage controller 102 is not associated with the FE port 103 mounted on the same migration destination storage controller 102. Accordingly, at least the same redundancy as the migration source is secured in the migration destination.

Subsequently, the storage controller 102 sets the virtual FE port name 1505 and the virtual FE port address 1506 of the corresponding migration source FE port 103 to the virtual FE port name 1505 and the virtual FE port address 1506 of each migration destination FE port 103 (Step 2104). Since logical units to be taken under charge of each port is determined by setting the port, logical units to be taken under charge of each port of the migration source are taken over to each port of the migration destination, respectively, by taking over the setting of the port as above. Accordingly, with respect to the data I/O to the logical unit, at least any one of the load distribution process or the takeover in a case of failure can be performed.

The hardware configuration information 806 and the FE port configuration information 807 stored by each storage controller 102 includes information in which each storage controller 102 is associated with the identification information of the FE port 103 mounted thereon. Therefore, based on the information, the FE port 103 mounted on the different migration source storage controller 102 can be associated with the FE port 103 mounted on the different migration destination storage controller 102.

For example, as illustrated in FIG. 3, the same values as the WWNs of the migration source FE ports 103A to 103D are set as virtual WWNs for the migration source FE ports 103E to 103H, respectively. Accordingly, the host computer 110 can recognize the migration destination FE port 103 to be the same as the corresponding migration source FE port 103. If the virtual FE port name 1505 and the virtual FE port address 1506 are set for the migration source FE port and are recognized by the host computer 110, the virtual FE port name 1505 and the virtual FE port address 1506 of the corresponding migration source FE port 103 are set to the virtual FE port name 1505 and the virtual FE port address 1506 of each migration destination FE port 103.

Subsequently, the storage controller 102 links down the FE port 103 of the migration source storage controller 102 (Step 2105), links up the FE port 103 of the migration destination storage controller 102 corresponding thereto (Step 2106), transmits configuration change notification from the migration destination FE port 103 to the host computer 110 (Step 2107), and determines whether an inquiry from the host computer 110 is received (Step 2108).

If an inquiry is not received from the host computer 110, since the connection to the host computer 110 cannot be confirmed, the storage controller 102 interrupts the FE port switching process and transmits the failure of the process and the physical port name of the failed FE port 103 to the management device 112 via the management network 113.

IF an inquiry is received from the host computer 110, the FE port switching process is completed.

FIG. 22 is a flowchart illustrating the old controller reduction process executed by the storage controller 102 according to the embodiment of the present invention.

First, the old storage controller 102 discards or destages the data on the cache memory (Step 2201). Specifically, if the data on the cache memory is already stored in the storage area in the drive box 109, the old storage controller 102 deletes the data from the cache memory, and if the data is not stored in the storage area in the drive box 109 yet, the old storage controller 102 stores the data and deletes the data from the cache memory.

Subsequently, the old storage controller 102 stops receiving a new process (Step 2202).

Subsequently, the old storage controller 102 waits for the stop of the running process which is already received (Step 2203).

Subsequently, each storage controller 102 updates the hardware configuration information 806 so that the reduction of the old storage controller 102 is reflected (Step 2204).

In the above, the old controller reduction process is completed.

FIG. 23 is a flowchart illustrating a control information address conversion process executed by the storage controller 102 according to the embodiment of the present invention.

First, the storage controller 102 acquires a software-specific control information address (Step 2301). Here, the software-specific control information address is an address of the control information to be accessed by the software of the corresponding storage controller.

Subsequently, the storage controller 102 determines whether the control information format of the own system and the storage destination control information format are identical to each other (Step 2302). If the formats are not identical to each other, the address of the control information acquired in Step 2301 is converted to a value corresponding to the storage destination control information format (Step 2303).

Subsequently, the storage controller 102 acquires the access destination physical address (Step 2304). Specifically, if it is determined that the formats are identical to each other in Step 2302, the storage controller 102 acquires the physical address corresponding to the address acquired in Step 2301, and if it is determined that the formats are not identical to each other in Step 2302, a physical address corresponding to the address converted in Step 2303 is acquired.

In the above, the control information address conversion process is completed.

For example, in the old storage controller 102A illustrated in FIG. 4, if the CPU 104A tries to access the control information according to the control program in the memory 105A after the format conversion (Step 402A) is performed to generate the new format control information 403A, the address of the old format control information 401A is acquired in Step 2301. In this case, it is determined that the formats are not identical to each other in Step 2302, the address of the old format control information 401A to be accessed is converted to the address of the new format control information 403A in Step 2303, and the address after the conversion is acquired in Step 2304. Accordingly, even after the control information format is converted, it is possible to access the control information, if necessary.

Also, the system according to the embodiment of the present invention may be configured as below.

(1) Provided is a storage system (for example, the storage system 100) including nodes (for example, the storage nodes 101) including a plurality of storage control units (for example, the storage controllers 102) each including a processor (for example, the CPU 104), a memory (for example, the memory 105), and ports (for example, the FE ports 103); and storage drives (for example, drives included in the drive boxes 109) including storage media that store data, and the plurality of storage control units each request data access and transmit and receive data with respect to host computers (for example, the host computers 110) via the plurality of ports, the plurality of processors process data that the host computers input and output to the storage drives, the plurality of memories store the control information referred by the processors in order to access the data stored in the storage drives, and the storage system transmits the control information stored in the memories of the storage control units to another node including a plurality of storage control units, stores the control information in the memories of the storage control units, and sets ports of the other node in consideration of a relationship between the storage control units and the ports of the nodes, if the other node can access data relating to the control information.

Accordingly, even when the storage control units are replaced, compared with cases before and after the replacement is executed, at least the same redundancy can be maintained without reducing the numbers of the storage control units and the ports.

(2) In (1), the processor of the storage control unit provides a logical unit with which the host computer inputs and outputs the data, the logical unit is associated with the port, and a setting of the port determines the logical unit to be taken under charge of the port.

(3) In (2), the logical units are associated with a plurality of ports relating to the plurality of different storage control units in the same node, and ports of the other node are set in consideration of a relationship between the storage control units and the ports of the node so that the plurality of ports associated with the same logical unit are associated with different storage control units of the other node.

(4) In (3), the plurality of different storage control units can perform at least any one of a load distribution process or takeover in a case of failure with respect to the input and output of the data to the logical unit.

(5) In (3), port setting in which a plurality of ports associated with different logical units associated with different storage control units of the node are associated with the same storage control units of the other node can be performed.

(6) In (1), the node includes a first storage control unit and a second storage control unit each including a plurality of ports, the other node includes a third storage control unit and a fourth storage control unit each including a plurality of ports, the first storage control unit and the second storage control unit share the same control information, if the control information included in the first storage control unit and the second storage control unit are transmitted to the other node, the third storage control unit and the fourth storage control unit store the control information in respective memories and share the same control information, the information of the ports of the first storage control unit is taken over by the ports of the third storage control unit, and the information of the ports of the second storage control unit is taken over by the ports of the fourth storage control unit.

(7) In (1), if the other node is added to the storage system, the control information is stored in the memory, and the ports are set, and the host computer is notified of the change of ports of a data access destination to ports of the other added node via the ports.

(8) In (1), the storage system is connected to a management device (for example, the management device 112) including a management unit that sets the ports.

(9) In (1), the storage control unit of the node converts the control information stored by the memory to a format appropriate for software executed by the processor of the storage control unit of the other node and transmits the control information of which the format is converted to the storage control unit of the other node, and the storage control unit of the other node stores the control information of which the format is converted in the memory.

(10) In (9), the conversion of the control information includes address conversion of the storage destination, and if a data access request is received from the host computer after the conversion of the control information format is completed, the storage control unit refers to a storage destination address after the conversion and accesses the data.

Further, the present invention is not limited to the above embodiment and includes other modifications. For example, the above embodiment is specifically described for better understanding of the present invention, and is not limited to necessarily include all the configurations of the description. Further, a part of the configuration of a certain embodiment can be replaced with the configuration of another embodiment, and a configuration of another embodiment can be added to a configuration of a certain embodiment. Further, with respect to a part of the configuration of each embodiment, another configuration can be added, deleted, or replaced.

Further, configurations, functions, processing units, processing means, and the like described above may be realized by hardware by designing apart or all thereof with, for example, an integrated circuit. Further, configurations, functions, processing units, processing means, and the like described above may be realized by software with a processor interpreting and executing programs that realize each function. Information such as programs, tables, and files that realize each function can be stored in storage devices such as nonvolatile semiconductor memories, hard disk drives, solid state drives (SSD), or computer-readable non-temporary data storage media such as IC cards, SD cards, and DVDs.

In addition, control lines and information lines are illustrated, if necessary for explanation, and not all control lines and information lines are illustrated in the product. In practice, it may be considered that almost all configurations are connected to each other.

What is claimed is:

1. A storage system comprising:
a node including a plurality of storage control units each including a processor, a memory, and a port; and
a storage drive including a storage medium that stores data,
wherein the processor of the storage control unit provides a logical unit with which a host computer inputs and outputs the data,
wherein the logical units are associated with a plurality of ports relating to the plurality of different storage control units in a same node, and
wherein the plurality of storage control units each request data access and transmit and receive data with respect to the host computer via the plurality of ports,
wherein the processors of the storage control units process data that the host computer inputs and outputs to the storage drive,
wherein the memories of the storage control units store control information referred by the processors in order to access the data stored in the storage drive, and
wherein the storage system transmits the control information stored in the memories of the storage control units to another node that includes a plurality of other storage control units, stores the control information in the memories of the storage control units of the another node, and sets ports of the another node in consideration of a relationship between the storage control units of the node and the ports of the nodes, by determining the logical unit to be taken under charge of a port from the another node so that the plurality of ports associated with a same logical unit are associated with different storage control units of the another node, if the another node can access data relating to the control information.

2. The storage system according to claim 1, wherein the plurality of different storage control units can perform at least any one of a load distribution process or takeover in a case of failure with respect to the input and output of the data to the logical unit.

3. The storage system according to claim 1, wherein port setting in which a plurality of ports associated with different logical units associated with different storage control units of the node are associated with the same storage control units of the another node can be performed.

4. The storage system according to claim 1,
wherein the node includes a first storage control unit and a second storage control unit each including a plurality of ports,
the another node includes a third storage control unit and a fourth storage control unit each including a plurality of ports,
the first storage control unit and the second storage control unit share the same control information, and
if the control information included in the first storage control unit and the second storage control unit are transmitted to the another node, the third storage control unit and the fourth storage control unit store the control information in respective memories and share the same control information, the information of the ports of the first storage control unit is taken over by the ports of the third storage control unit, and the information of the ports of the second storage control unit is taken over by the ports of the fourth storage control unit.

5. The storage system according to claim 1,
wherein, if the another node is added to the storage system, the control information is stored in the memory, and the ports are set, and
the host computer is notified of the change of the ports of a data access destination to ports of the other added node via the ports.

6. The storage system according to claim 1,
wherein the storage system is connected to a management device including a management unit that sets the ports.

7. A storage system comprising:
a node including a plurality of storage control units each including a processor, a memory, and a port; and
a storage drive including a storage medium that stores data,
wherein the plurality of storage control units each
request data access and transmit and receive data with respect to a host computer via the plurality of ports,
the processors of the storage control units process data that the host computer inputs and outputs to the storage drive,
the memories of the storage control units store control information referred by the processors in order to access the data stored in the storage drive, and
the storage system transmits the control information stored in the memories of the storage control units to another node including a plurality of storage control units, stores the control information in the memories of the storage control units of the another node, and sets ports of the other node in consideration of a relationship between the storage control units and the ports of the nodes, if the other node can access data relating to the control information,
wherein the storage control unit of the node converts the control information stored by the memory to a format appropriate for software executed by the processor of the storage control unit of the other node and transmits the control information of which the format is converted to the storage control unit of the other node,
wherein the storage control unit of the other node stores the control information of which the format is converted in the memory and access the control information of which the format is converted in the memory to access the data in the storage drive,
wherein the conversion of the control information includes address conversion of the control information to be accessed by a processor of the another node to execute the software, and
wherein the storage control unit of the node converts the address and accesses the control information of which the format is converted to acquire a storage destination of the data in the storage drive in order to access the data stored in the storage drive.

8. A method of controlling a storage system including a node including a plurality of storage control units each including a processor, a memory, and a port; and a storage drive including a storage medium that stores data, the method comprising:
requesting data access and transmitting and receiving data with respect to a host computer via the plurality of ports,
providing, by the processors of the storage control units, data that the host computer inputs and outputs to the storage drive,
storing, by the plurality of memories of the storage control units, control information referred by the processors in order to access the data stored in the storage drive,
transmitting the control information stored in the memories of the storage control units to another node including a plurality of storage control units, storing the control information in the memories of the storage control units, and setting ports of the other node in consideration of a relationship between the storage control units and the ports of the nodes, if the other node can access data relating to the control information,
converting, by the storage control unit of the node, the control information stored by the memory to a format appropriate for software executed by the processor of the storage control unit of the other node and transmitting the control information of which the format is converted to the storage control unit of the other node,
storing, by the storage control unit of the other node, the control information of which the format is converted in the memory and accessing the control information of which the format is converted in the memory to access the data in the storage drive,
wherein the conversion of the control information includes address conversion of the control information to be accessed by a processor of the another node to execute the software, and
converting, by the storage control unit of the node, the address and accessing the control information of which the format is converted to acquire a storage destination of the data in the storage drive in order to access the data stored in the storage drive.

* * * * *